(12) United States Patent
Kobashi

(10) Patent No.: US 11,838,484 B2
(45) Date of Patent: Dec. 5, 2023

(54) COLOR MANAGEMENT FOR INFORMATION PROCESSING APPARATUS, PRINTING SYSTEM, MANAGEMENT METHOD FOR IMAGE FORMING, AND MEDIUM

(71) Applicant: CANON KABUSHIKI KAISHA, Tokyo (JP)

(72) Inventor: Kazufumi Kobashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 31 days.

(21) Appl. No.: 17/592,083

(22) Filed: Feb. 3, 2022

(65) Prior Publication Data

US 2022/0263977 A1    Aug. 18, 2022

(30) Foreign Application Priority Data

Feb. 16, 2021    (JP) .................................. 2021-022705

(51) Int. Cl.
  *H04N 1/60*    (2006.01)
(52) U.S. Cl.
  CPC ......... *H04N 1/6041* (2013.01); *H04N 1/6008* (2013.01); *H04N 1/6038* (2013.01)
(58) Field of Classification Search
  CPC ............................................ H04N 1/60–6055
  See application file for complete search history.

(56) References Cited

U.S. PATENT DOCUMENTS

| 7,965,407 | B2 | 6/2011 | Yoshida | |
| 2004/0136025 | A1* | 7/2004 | Moriyama | ......... H04N 1/00087 358/1.14 |
| 2008/0239400 | A1* | 10/2008 | Yoshida | ............. H04N 1/00063 358/3.01 |
| 2016/0156810 | A1* | 6/2016 | Nakamura | ......... H04N 1/00015 358/1.9 |
| 2019/0095147 | A1* | 3/2019 | Yano | .................... H04N 1/6044 |

FOREIGN PATENT DOCUMENTS

JP        2008238459 A    10/2008

* cited by examiner

*Primary Examiner* — Barbara D Reinier
(74) *Attorney, Agent, or Firm* — ROSSI, KIMMS & McDOWELL LLP

(57) ABSTRACT

An information processing apparatus is provided. The apparatus comprises at least one memory; and at least one processor, wherein the at least one memory stores at least one program that causes the at least one processor to perform operations including acquiring, periodically, in response to a request, or both, a color verification result of a printed article printed by an image forming apparatus from a storage storing a color measurement result of a printed article printed by the image forming apparatus, and in a case where the color verification result for the image forming apparatus to execute an instructed image forming satisfies a reference, executing the instructed image forming.

18 Claims, 21 Drawing Sheets

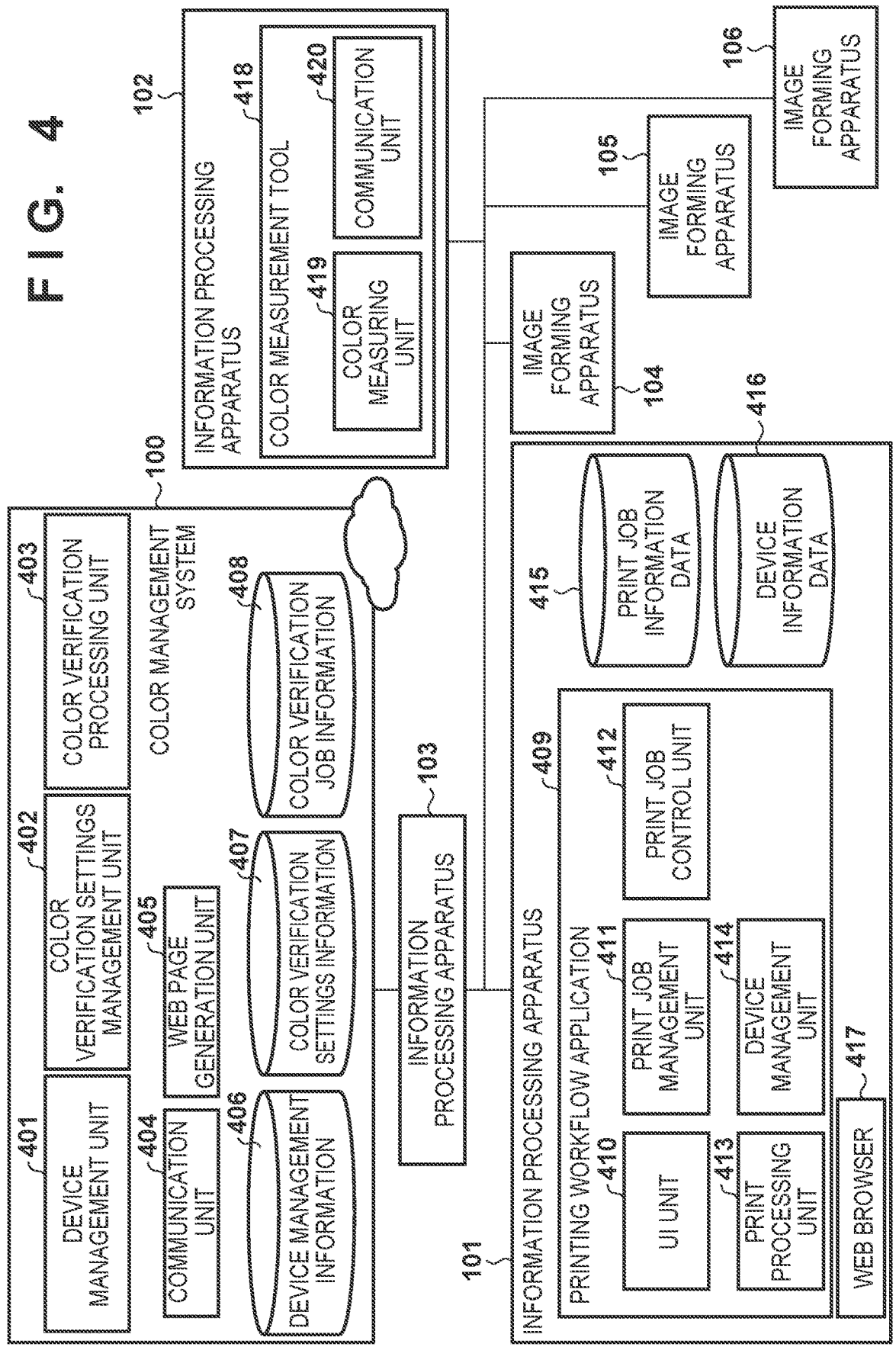

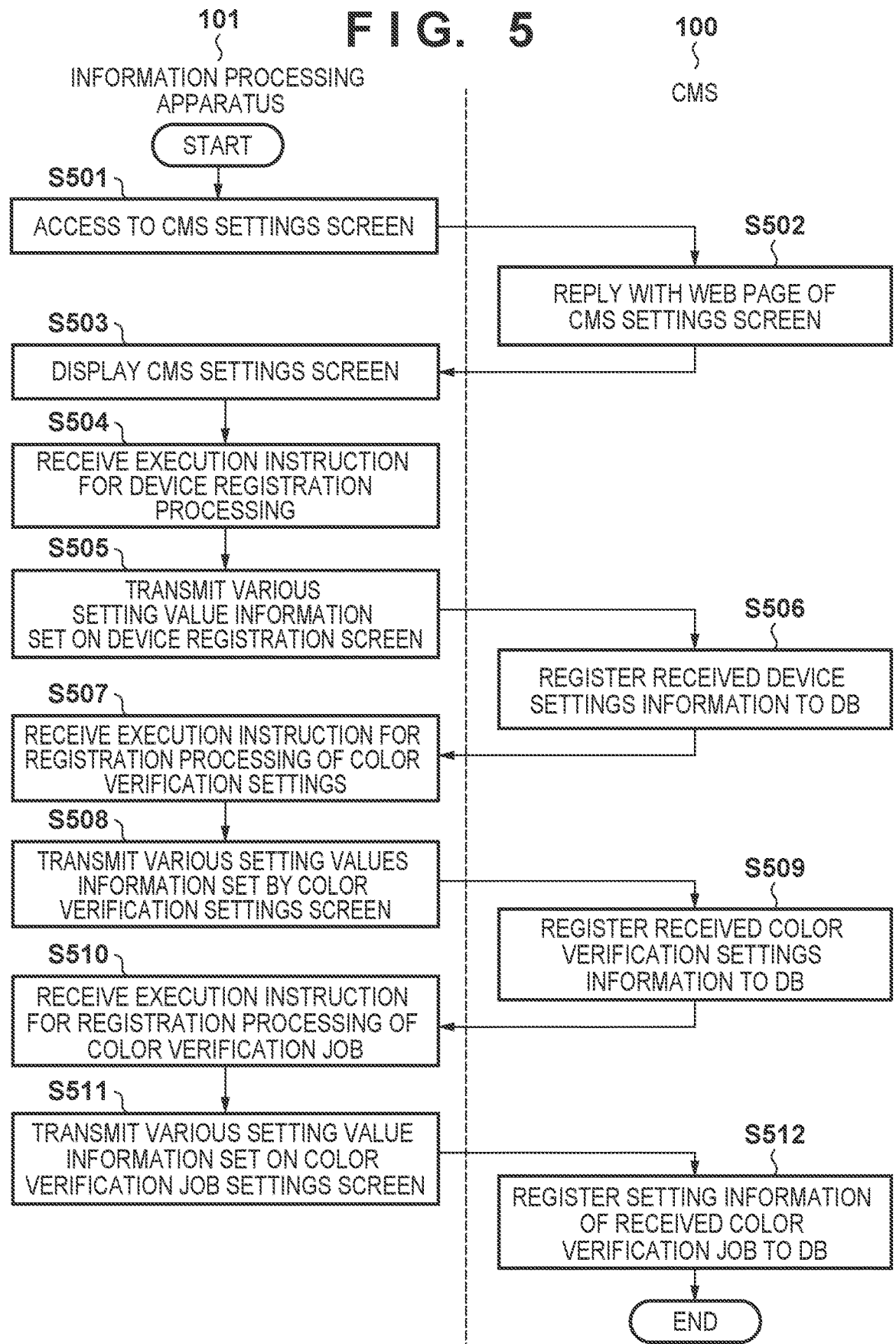

FIG. 6B

COLOR MANAGEMENT SYSTEM  - SETTINGS -

LOGIN NAME: lmn456 — 608

- DEVICE
- COLOR VERIFICATION SETTINGS
- COLOR VERIFICATION JOB

[+ ADD]  [CHANGE]  [× DELETE]

609

| No | DEVICE NAME | MODEL | COUNTRY | COMPANY NAME | SITE NAME | IP ADDRESS | OTHER |
|----|-------------|-------|---------|--------------|-----------|------------|-------|
| 1 | iPC12xxxxx | XYZ | Japan | □□ PRINTING | ▲▲ FACTORY | 1xx.3xx.3... | xxxxxx |
| 2 | Pro xxxxx | KKK | Japan | □□ PRINTING | ▲▲ FACTORY | 1xx.3xx.4... | xxxxxxx |
| 3 | Cpress xxx | MMA | Japan | □□ PRINTING | ○○ FACTORY | 1xx.3xx.5... | xx |
| 4 | iPress Cxxx | MML | Japan | □□ PRINTING | ○○ FACTORY | 1xx.3xx.6... | xxxxxxx |
| 5 | ..... | ... | ... | ... | ... | ... | ... |
| 6 | ..... | ... | ... | ... | ... | ... | ... |
| 7 | ..... | ... | ... | ... | ... | ... | ... |
| 8 | ..... | ... | ... | ... | ... | ... | ... |

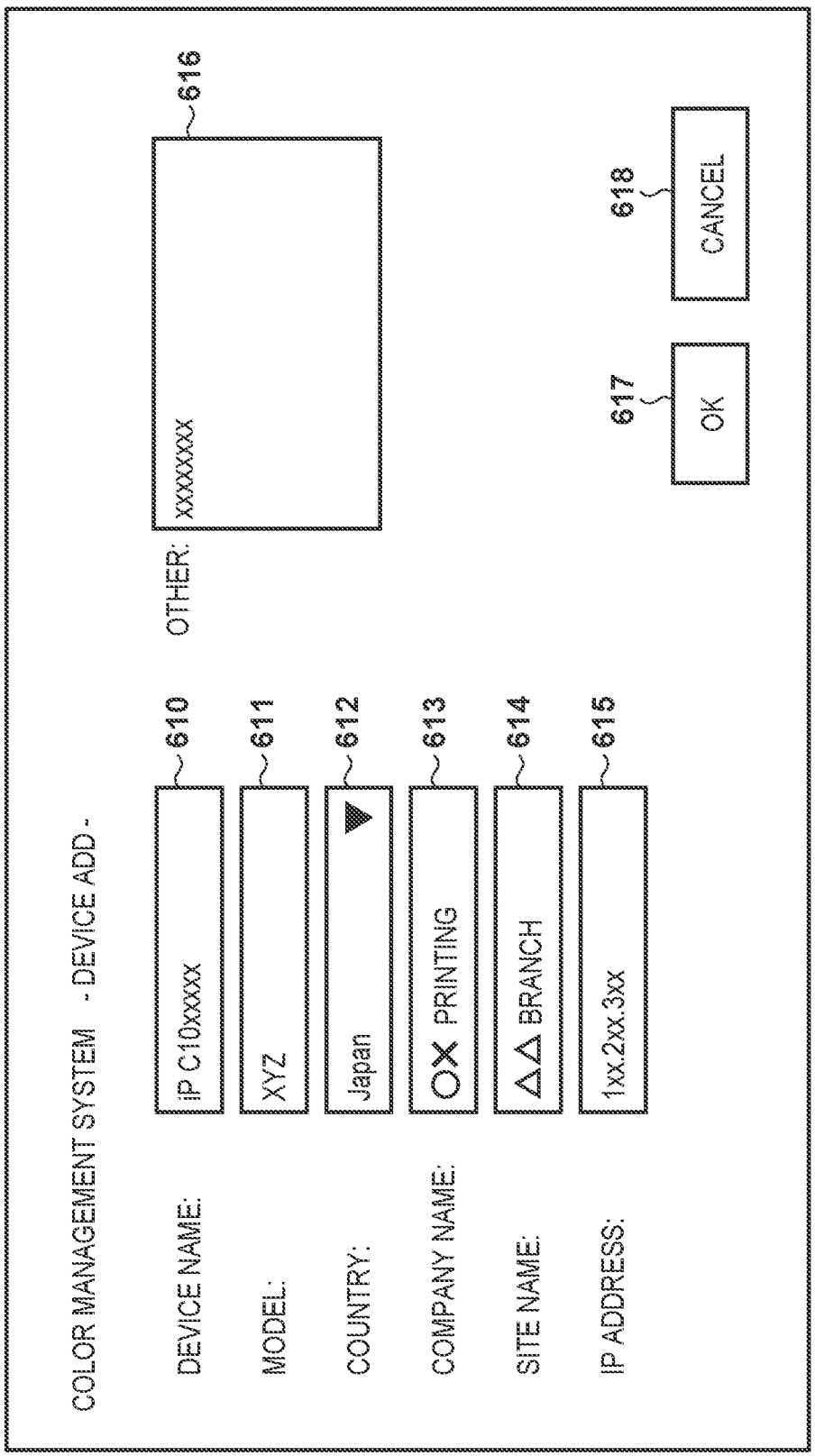

FIG. 6D

COLOR MANAGEMENT SYSTEM - SETTINGS -

LOGIN NAME: ABC123

DEVICE
COLOR VERIFICATION SETTINGS
COLOR VERIFICATION JOB

619

+ CREATE  620
CHANGE  621
× DELETE  622

| No | COLOR VERIFICATION SETTING NAME | REFERENCE PROFILE | TOLERANCE VALUE | COMPANY NAME | OTHER |
|----|-------------------------------|-------------------|-----------------|--------------|-------|
| 1  | TG-JPC_3 | JapanColor2011 | ΔE ±3 | ○× PRINTING | xxxxxxx |
| 2  | TG-FG_5 | Fogra coated | ΔE ±5 | ○× PRINTING | xxxxxxxx |
| 3  | TG-JPC_0 | JapanColor2011 | — | ○× PRINTING | xxxxxxxx |
| 4  | ··· | ··· | ··· | ··· | ··· |
| 5  | ··· | ··· | ··· | ··· | ··· |

COLOR MANAGEMENT SYSTEM - SETTINGS -

LOGIN NAME: ABC123

| DEVICE | | | | | | | |
|---|---|---|---|---|---|---|---|
| COLOR VERIFICATION SETTINGS | | | | | | | |
| COLOR VERIFICATION JOB 602 | | | | | | | |

630

| | 631 +CREATE | 632 CHANGE | 633 ×DELETE |
|---|---|---|---|

| No | COLOR VERIFICATION JOB NAME | TARGET DEVICE | REFERENCE COLOR VERIFICATION SETTINGS | EXECUTION TIMING | PERIODIC INTERVAL | TIME 1 | VERIFICATION RESULT (LATEST) |
|---|---|---|---|---|---|---|---|
| 1 | iPC10_PERIODIC | iPC10xxxxx | TG-JPC_3 | PERIODIC | 1 | 8:30 | OK |
| 2 | iPC9_AUTOMATIC | iPC9xxxx | TG-JPC_3 | AUTOMATIC | — | — | NG |
| 3 | Pro xxx_AUTOMATIC | Pro xxxxx | TG-JPC_3 | AUTOMATIC | — | — | OK |
| 4 | Color50x_PERIODIC | Color50xxxx | TG-JPC_0 | PERIODIC | 2 | 7:00 | OK |
| 5 | xxPress_PERIODIC | xxxxxPress | TG-JPC_0 | PERIODIC | 1 | 10:00 | OK |
| 6 | ..... | ... | ... | ... | ... | ... | ... |
| 7 | ..... | ... | ... | ... | ... | ... | ... |

634 TRANSMIT JOB FOR COLOR MEASUREMENT

635 EXECUTE COLOR VERIFICATION

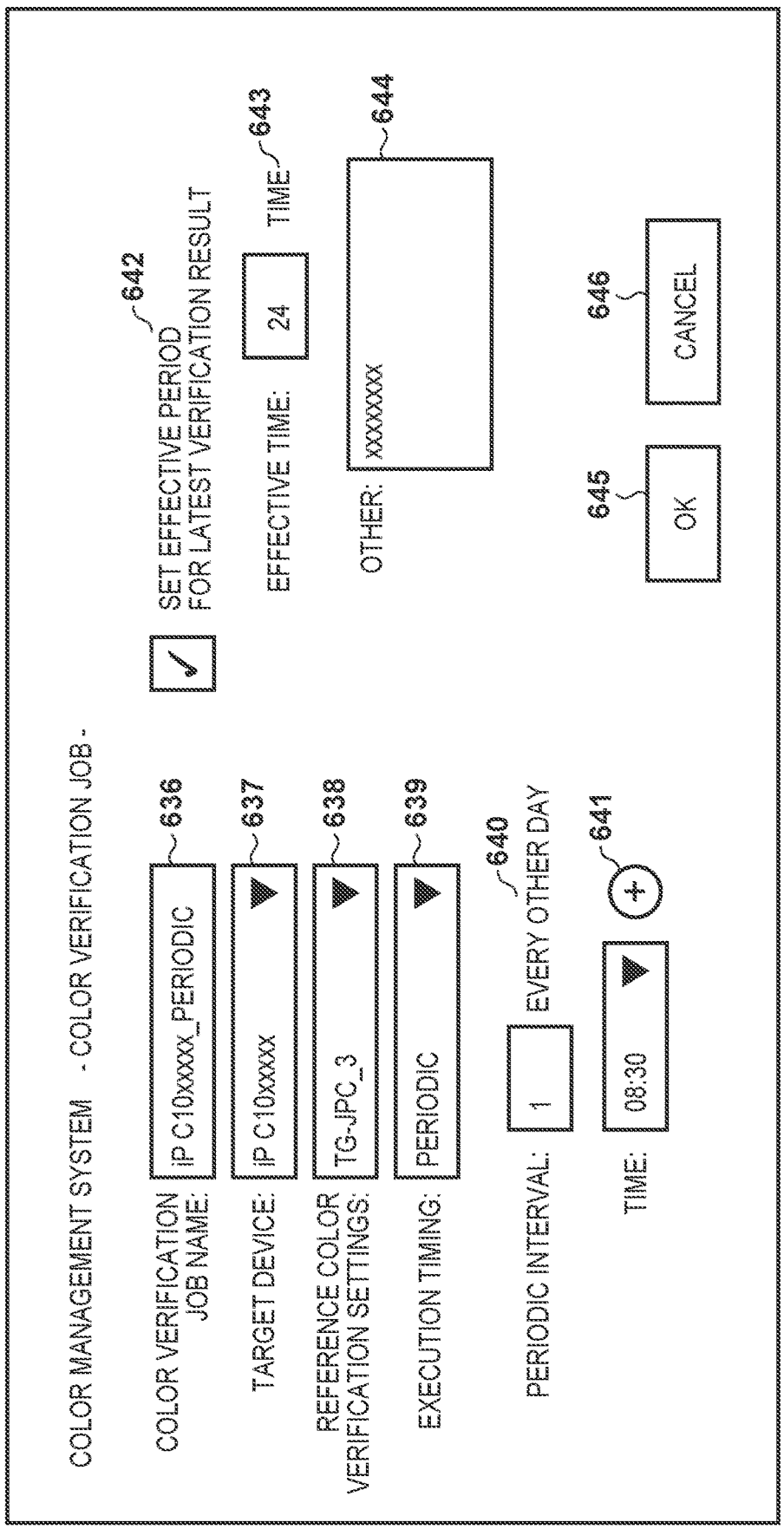

FIG. 6H

COLOR MANAGEMENT SYSTEM - COLOR VERIFICATION -

IN-PROGRESS COLOR VERIFICATION JOB INFORMATION

COLOR VERIFICATION JOB NAME: IP C10xxxxx_PERIODIC
TARGET DEVICE: IP C10xxxxx
COMPANY NAME: ○✕ PRINTING COMPANY
SITE NAME: △△ BRANCH
IP ADDRESS: 1xx.2xx.3xx
REFERENCE COLOR VERIFICATION SETTINGS: TG-JPC_3
REFERENCE PROFILE: Japan Color 2011
TOLERANCE VALUE(ΔE VALUE): 3

647

PLEASE MEASURE COLOR OF COLOR PATCH FOR COLOR MEASUREMENT BY COLORIMETER.

COLOR MEASUREMENT INFORMATION

| ITEM | REFERENCE VALUE | MEASUREMENT VALUE |
|---|---|---|
| CMY GRAY AVERAGE | 1.5 | |
| CMY GRAY MAXIMUM | 3 | |
| K AVERAGE | 1.5 | |
| K MAXIMUM | 3 | |
| ... | 3 | |

648

RESULT

DURING VERIFICATION

649

650 — CLOSE

FIG. 6I

COLOR MANAGEMENT SYSTEM - COLOR VERIFICATION -

IN-PROGRESS COLOR VERIFICATION JOB INFORMATION

COLOR VERIFICATION JOB NAME: IP C10xxxxx_PERIODIC

TARGET DEVICE: IP C10xxxxx

COMPANY NAME: ○✕ PRINTING COMPANY

SITE NAME: △△ BRANCH

IP ADDRESS: 1xx.2xx.3xx

REFERENCE COLOR VERIFICATION SETTINGS: TG-JPC_3

REFERENCE PROFILE: Japan Color 2011

TOLERANCE VALUE(ΔE VALUE): 3

647

(i) PLEASE MEASURE COLOR OF COLOR PATCH FOR COLOR MEASUREMENT BY COLORIMETER.

COLOR MEASUREMENT INFORMATION

| ITEM | REFERENCE VALUE | MEASUREMENT VALUE |
|---|---|---|
| CMY GRAY AVERAGE | 1.5 | 1.4 |
| CMY GRAY MAXIMUM | 3 | 2.9 |
| K AVERAGE | 1.5 | 1.6 |
| K MAXIMUM | 3 | 3 |
| ... | 3 | 3.1 |

651

RESULT

OK  2020/10/25 08:35:45

652

CLOSE

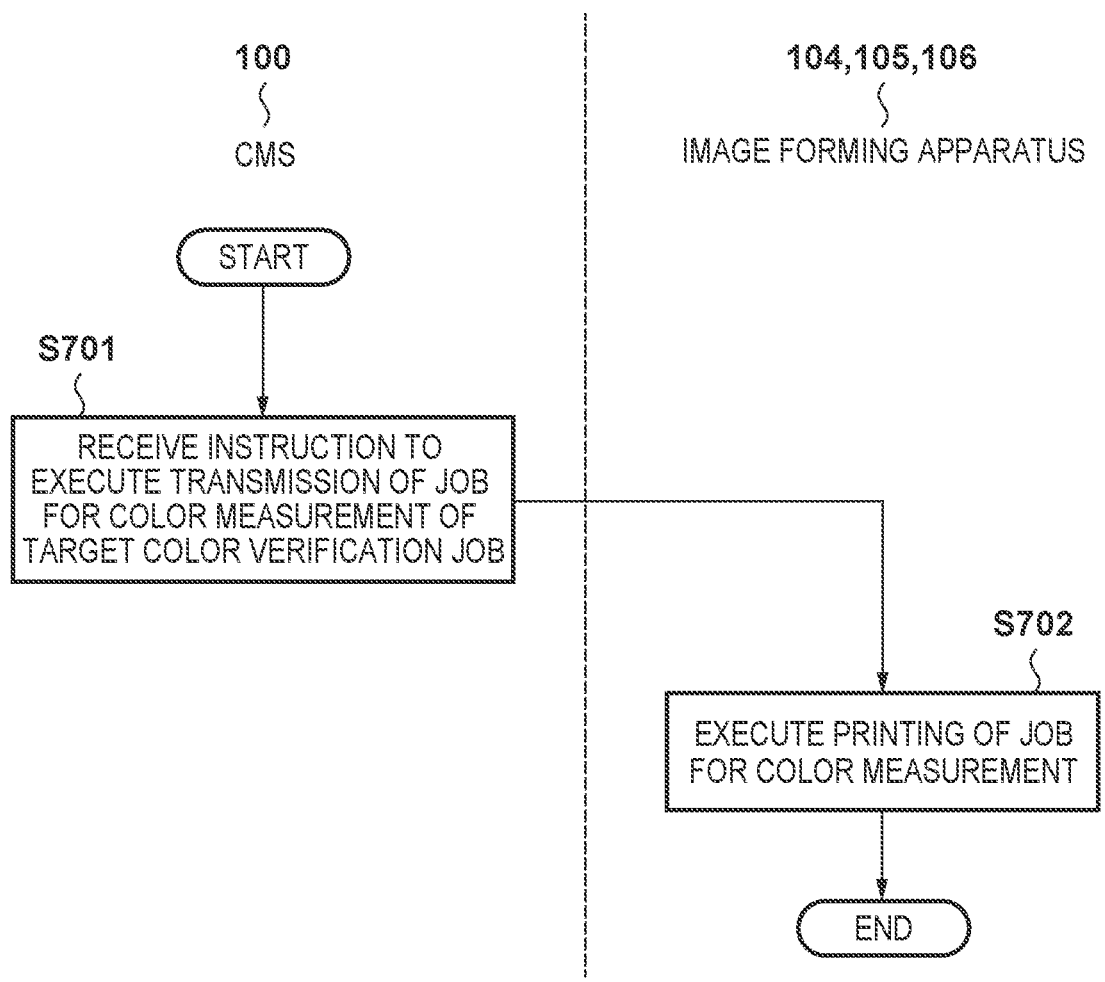

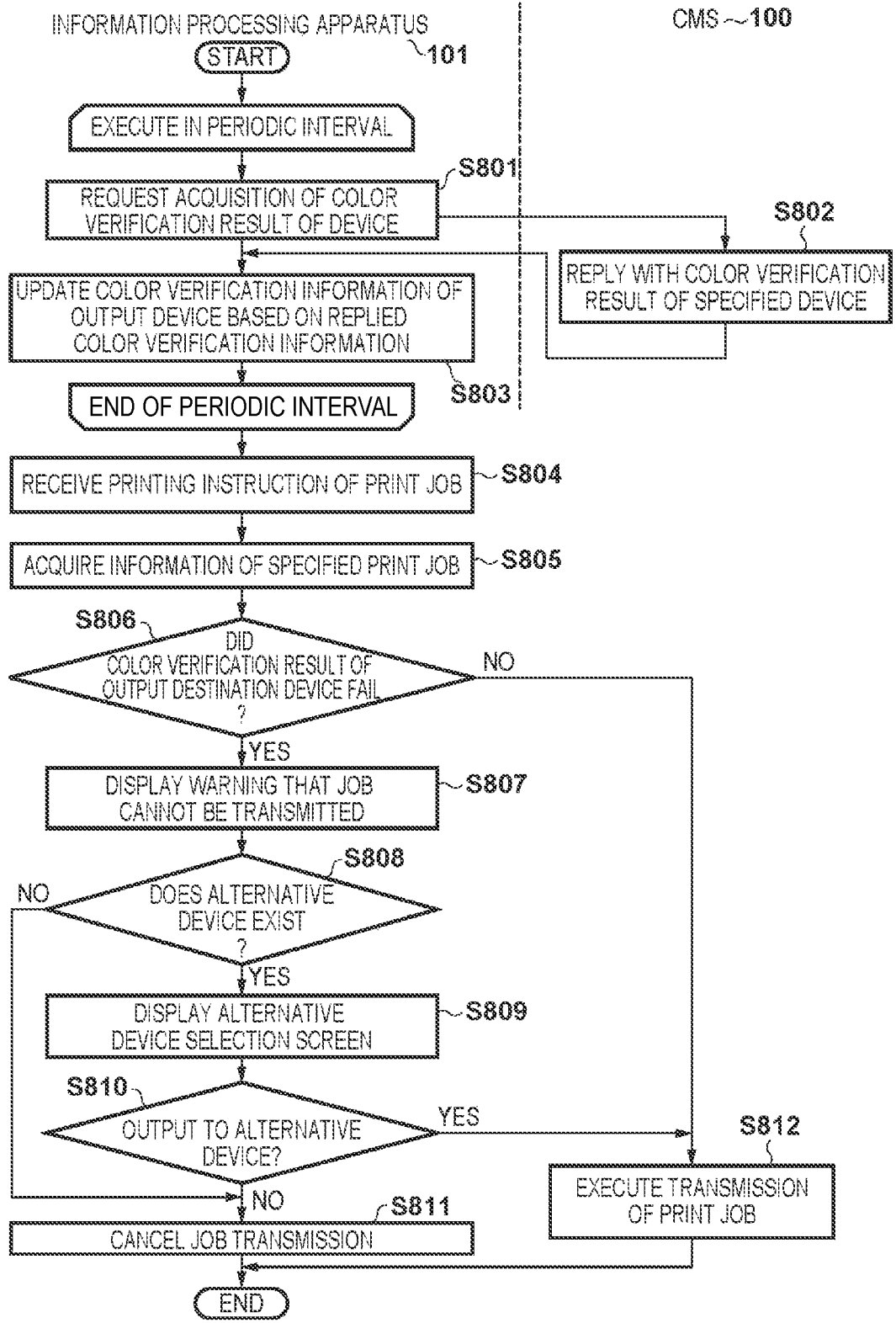

FIG. 9

PRINT WF APPLICATION

MENU — 902 — 903

[ PRINT ] [ DELETE ]

JOB LIST — 901

| | ORDER ID | JOB ID | JOB NAME | STATUS | QUANTITY | ONE-SIDED/ TWO-SIDED | COLOR | SHEET | ... | OUTPUT DESTINATION |
|---|---|---|---|---|---|---|---|---|---|---|
| ☑ | O-001 | Job0001 | MANUAL A | PREPARATION COMPLETE | 100 | TWO-SIDED | MONO-CHROME | QUALITY PAPER | ... | iP C9xxxx ▶ |
| ☐ | O-002 | Job0002 | FLYER 001 | PREPARATION COMPLETE | 250 | ONE-SIDED | COLOR | COATED PAPER | ... | iP C10xxxxx ▶ |
| ☐ | O-002 | Job0003 | CATALOG B | PREPARATION COMPLETE | 80 | TWO-SIDED | COLOR | COATED PAPER | ... | iP C10xxxxx ▶ |
| ☐ | ... | ... | ... | ... | ... | ... | ... | ... | ... | ... ▶ |
| ☐ | ... | ... | ... | ... | ... | ... | ... | ... | ... | ... ▶ |
| ☐ | ... | ... | ... | ... | ... | ... | ... | ... | ... | ... ▶ |

DEVICE LIST — 904

| DEVICE LIST | COMMUNI-CATION | COLOR VERIFICATION |
|---|---|---|
| iP C10xxxx | OK | OK |
| iP C9xxxx | OK | NG |
| Pro xxxxxx | OK | OK |

[ UPDATE ] — 905

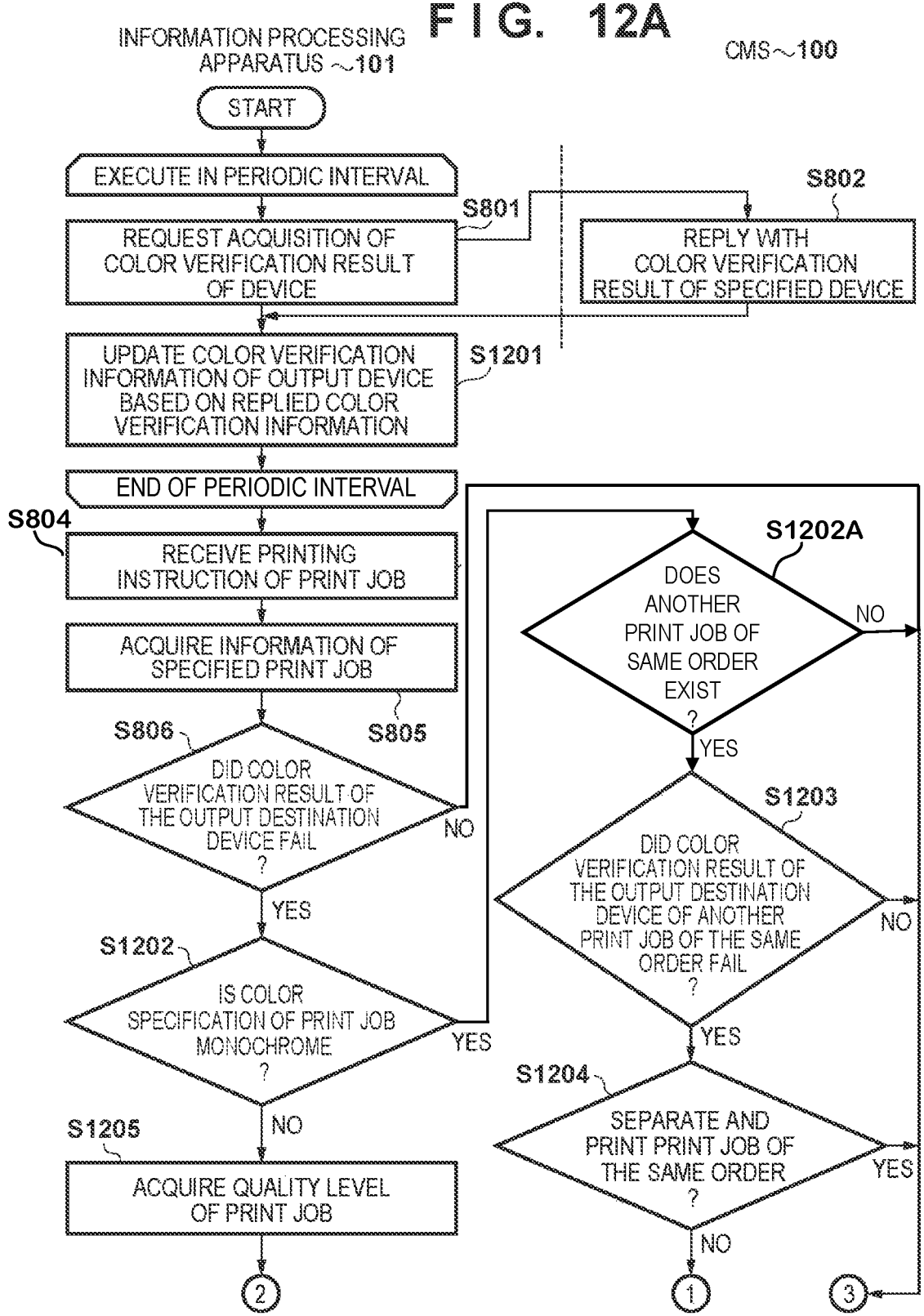

FIG. 13

```
┌─────────────────────────────────────────────────────────┐
│ PRINT WF APPLICATION                                    │
├─────────────────────────────────────────────────────────┤
│                                                         │
│   ⓘ   A COLOR ADJUSTMENT OPERATION IS REQUIRED          │
│       FOR PRINTING THE PRINT JOB OF THE SAME ORDER.     │
│       EXECUTE TRANSMISSION FOR ONLY THE CURRENT PRINT JOB? │
│                                                         │
│                                                         │
│         1301 ─┤  YES  │    │  NO  ├─ 1302              │
└─────────────────────────────────────────────────────────┘
```

COLOR MANAGEMENT FOR INFORMATION PROCESSING APPARATUS, PRINTING SYSTEM, MANAGEMENT METHOD FOR IMAGE FORMING, AND MEDIUM

BACKGROUND OF THE INVENTION

Field of the Invention

The present invention relates to an information processing apparatus, a printing system, a management method for image forming, and a medium and particularly relates to a printing workflow system that cooperates with a color management system.

Description of the Related Art

In commercial printing, there is a demand for the color in printing performed by a printer to be accurately reproduced. Thus, at the print site, the state of color of the printer is periodically verified (hereinafter, referred to as color verification), and, in a case where color cannot be accurately reproduced, the state of color is adjusted (hereinafter, referred to as color adjustment) to maintain a state in which color can be accurately reproduced. When a printed article is produced using a printer which, as the result of color verification, has been determined to be in a state in which color cannot be accurately reproduced, it is highly likely that printed articles of the quality desired by the customer are unable to be produced. A known technology for solving this problem includes a printer that, when it is time to perform color adjustment, can produce a monochrome print job stored in the printer queue before performing color adjustment (see Japanese Patent Laid-Open No. 2008-238459).

According to the technology described in Japanese Patent Laid-Open No. 2008-238459, when it is time for the printer to perform color adjustment, a monochrome print job in the queue of the printer can be produced before performing color adjustment. On the other hand, for color print jobs with a high likelihood of the color being unable to be reproduced, production is made unable to be started.

However, with this technology, when it is time to perform color adjustment, production of the printed article can be controlled, but production of the printed article is unable to be controlled in accordance with the color verification result. For example, even in a case where, as the result of performing color verification of the printer, it is determined that the printer is not in a state in which color can be accurately reproduced, unless it is time to actually perform color adjustment, production of the printed article cannot be controlled. Also, even in a case where color verification is not periodically performed and the color reproduction state of the printer is uncertain, production of the printed article cannot be controlled. Thus, production of the printed article may be performed in a state in which there is a likelihood that the printer cannot accurately reproduce color, making printing defects likely.

SUMMARY OF THE INVENTION

According to the present invention, production of a printed article is controlled in accordance with the color verification state of a printer to not produce printing defects.

The present invention has the following configuration. According to one aspect of the present invention, there is provided an information processing apparatus, comprising: at least one memory; and at least one processor, wherein the at least one memory stores at least one program that causes the at least one processor to perform operations including: acquiring, periodically, in response to a request, or both, a color verification result of a printed article printed by an image forming apparatus from a storage storing a color measurement result of a printed article printed by the image forming apparatus, and in a case where the color verification result for the image forming apparatus to execute an instructed image forming satisfies a reference, executing the instructed image forming.

According to another aspect of the present invention, there is provided a printing system, comprising: an information processing apparatus; a color management system including a storage; and an image forming apparatus, wherein the information processing apparatus includes at least one memory; and at least one processor, wherein the at least one memory stores at least one program that causes the at least one processor to perform operations including: acquiring, periodically, in response to a request, or both, a color verification result of a printed article printed by an image forming apparatus from the storage storing a color measurement result of a printed article printed by the image forming apparatus, and in a case where the color verification result for the image forming apparatus to execute an instructed image forming satisfies a reference, executing the instructed image forming.

According to the present invention, production of a printed article can be controlled in accordance with the color verification state of a printer to not produce printing defects.

Further features of the present invention will become apparent from the following description of exemplary embodiments with reference to the attached drawings.

BRIEF DESCRIPTION OF THE DRAWINGS

FIG. 4 is a diagram illustrating the software configuration of an embodiment of the present invention.

FIG. 5 is a flowchart illustrating registration processing for color verification settings of an embodiment of the present invention.

FIG. 6B is a diagram illustrating an example of a device settings screen of a color management system of an embodiment of the present invention.

FIG. 6C is a diagram illustrating an example of a device settings screen of a color management system of an embodiment of the present invention.

FIG. 6D is a diagram illustrating an example of a color verification settings screen of a color management system of an embodiment of the present invention.

FIG. 6F is a diagram illustrating an example of a color verification settings screen of a color management system of an embodiment of the present invention.

FIG. 6G is a diagram illustrating an example of a color verification job settings screen of a color management system of an embodiment of the present invention.

FIG. 6H is a diagram illustrating an example of a color verification job settings screen of a color management system of an embodiment of the present invention.

FIG. 6I is a diagram illustrating an example of a color verification job settings screen of a color management system of an embodiment of the present invention.

FIG. 7A is a flowchart illustrating color verification processing of an embodiment of the present invention.

FIG. 8 is a flowchart illustrating transmission processing for a print job in a first embodiment of the present invention.

FIG. 9 is a diagram illustrating an example of a print job management screen of an embodiment of the present invention.

FIGS. 12A and 12B are flowcharts illustrating transmission processing for a print job in a second embodiment of the present invention.

FIG. 13 is a diagram illustrating an example of a message screen of the present invention.

DESCRIPTION OF THE EMBODIMENTS

Figure 1:
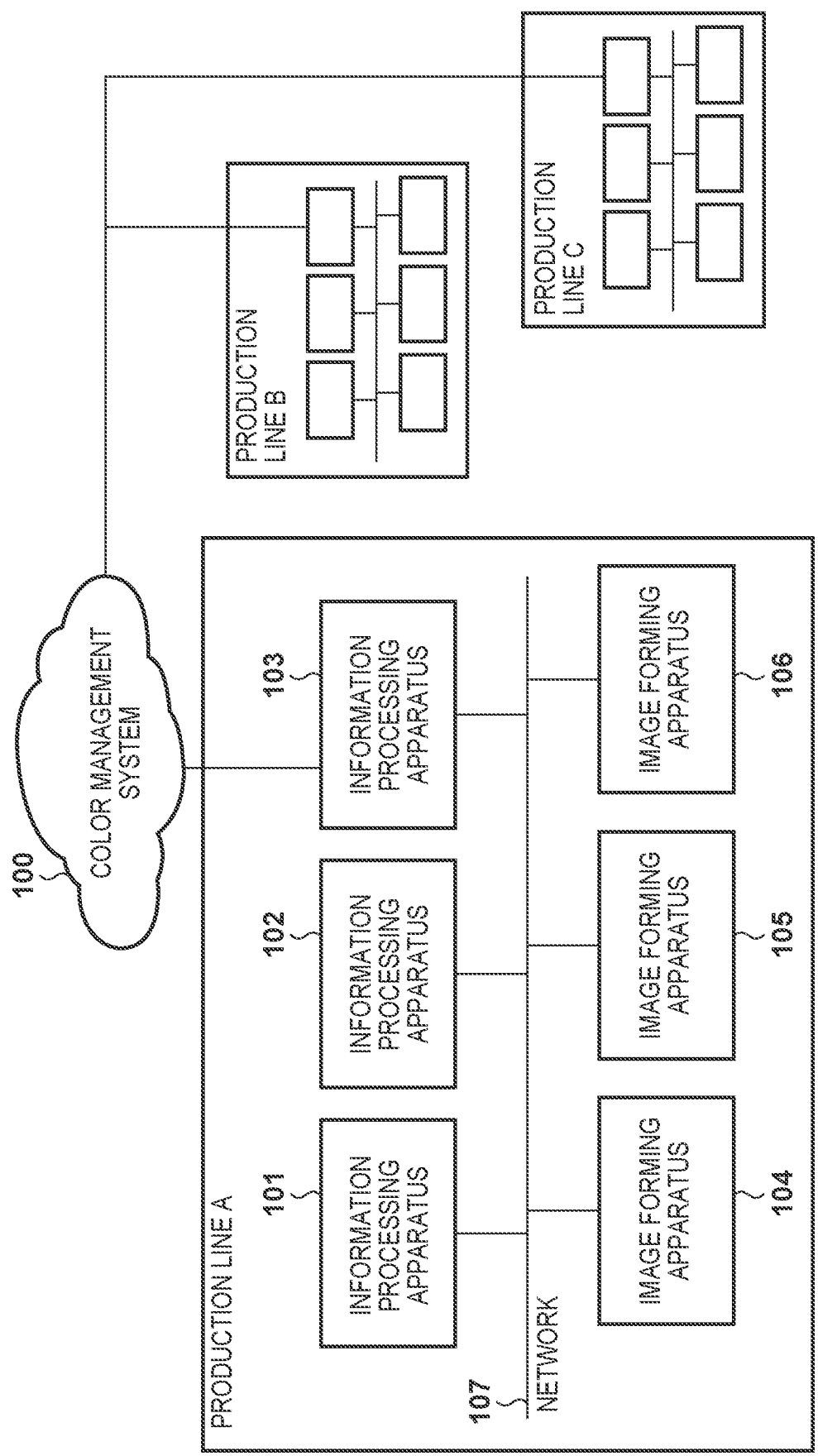
FIG. 1 is a diagram illustrating the system configuration of an embodiment of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

System Configuration

FIG. 1 is a diagram illustrating a system configuration diagram of a printing system according to an embodiment of the present invention. The system configuration of the present embodiment includes a color management system (hereinafter, CMS) 100, information processing apparatuses 101, 102, 103, and image forming apparatuses 104, 105, 106. The information processing apparatuses 101, 102, 103 and the image forming apparatuses 104, 105, 106 are connected to one another via a network 107. In this example, the information processing apparatuses 101, 102, 103 and the image forming apparatuses 104, 105, 106 belong to a production line A for producing printed articles.

The CMS 100 is a cloud service that manages the color state of the image forming apparatuses of a plurality of production lines and is also connected to a production line B and a production line C with a similar configuration to the production line A. Regarding the production lines illustrated here, as long as the production lines are able to connect to the CMS 100, the production lines may be provided in the same printing factory or provided in different printing factories. The CMS 100 is implemented by one or a plurality of server computers (servers) executing a program. The hardware configuration of the server may be similar to that of the information processing apparatus 101 and the like illustrated in FIG. 2, and the user interface may be configured to be shared across the plurality of servers.

The information processing apparatus 101 has functions including managing orders and production of a printed article, sending printing instructions to the image forming apparatuses 104, 105, 106, and accessing the CMS 100 and checking the color state of the connected image forming apparatuses. The information processing apparatus 102 has functions including performing color measurement of a printed article for color measurement output from an image forming apparatus and transmitting the obtained color information to the CMS 100. The information processing apparatus 103 is a proxy server that acts as an intermediary for connecting the various apparatuses of the production line A and the CMS 100 and for communications between the various apparatuses of the production line A connected to a local area network and the CMS 100 connected to a public network.

The image forming apparatuses 104, 105, 106 analyze print data transmitted from the information processing apparatus 101 or the like and converts and prints the print data into a dot image one page at a time. The image forming apparatuses 104, 105, 106 are able to be provided with a finisher for performing post-processing, such as stapling, punching, folding, bookbinding, cutting, and the like and is able to output a printed article that has been printed and subject to the various types post-processing.

Note that in the example illustrated in FIG. 1, there are three information processing apparatuses and three image forming apparatuses connected together. However, a different configuration may be used. For example, the print data from a plurality of information processing apparatuses may be processed by a single image forming apparatus. Also, a configuration may be used in which an external controller (not illustrated) is connected to an image forming apparatus, and the external controller has the function of processing print data for an information processing apparatus bypassing the information processing apparatus. In another example, the processing to transmit the color measurement and the obtained color information to a CMS that the information processing apparatus 102 is responsible for in the present embodiment may be executed within an image forming apparatus (or a connected external controller).

Figure 2:
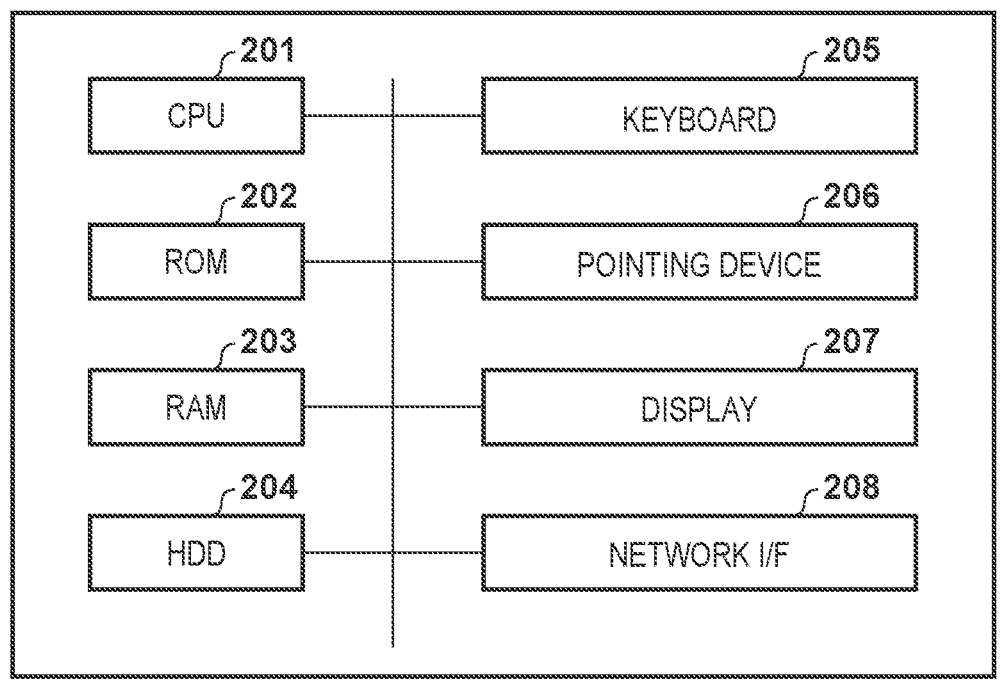
FIG. 2 is a diagram illustrating the hardware configuration of an information processing apparatus of an embodiment of the present invention.

FIG. 2 is a hardware configuration diagram of the information processing apparatuses 101, 102, 103. A CPU 201 reads out control programs stored in a ROM 202 and executes various types of control processing. A RAM 203 is a main memory of the CPU 201 and is used as a temporary storage area such as a working area. A HDD 204 stores image data and various types of programs. A keyboard 205 is an input apparatus for an operator or the like to input instructions as well as sending instructions, such as control commands and text input, to an application described below. A pointing device 206 is, together with the keyboard 205, an input apparatus for an operator or the like to input instructions as well as sending instructions such as control command to an application described below. A display 207 is an output apparatus including a display unit for displaying commands input via the keyboard 205 or the pointing device 206, the state of the application described below, and the like. A network I/F 208 is for connecting the information processing apparatuses 101, 102, 103 to a network (Local Area Network, the Internet, or the like). The information processing apparatuses 101, 102, 103 transmit and receive various pieces of information to and from other apparatuses on the network using the network I/F 208.

Figure 3:
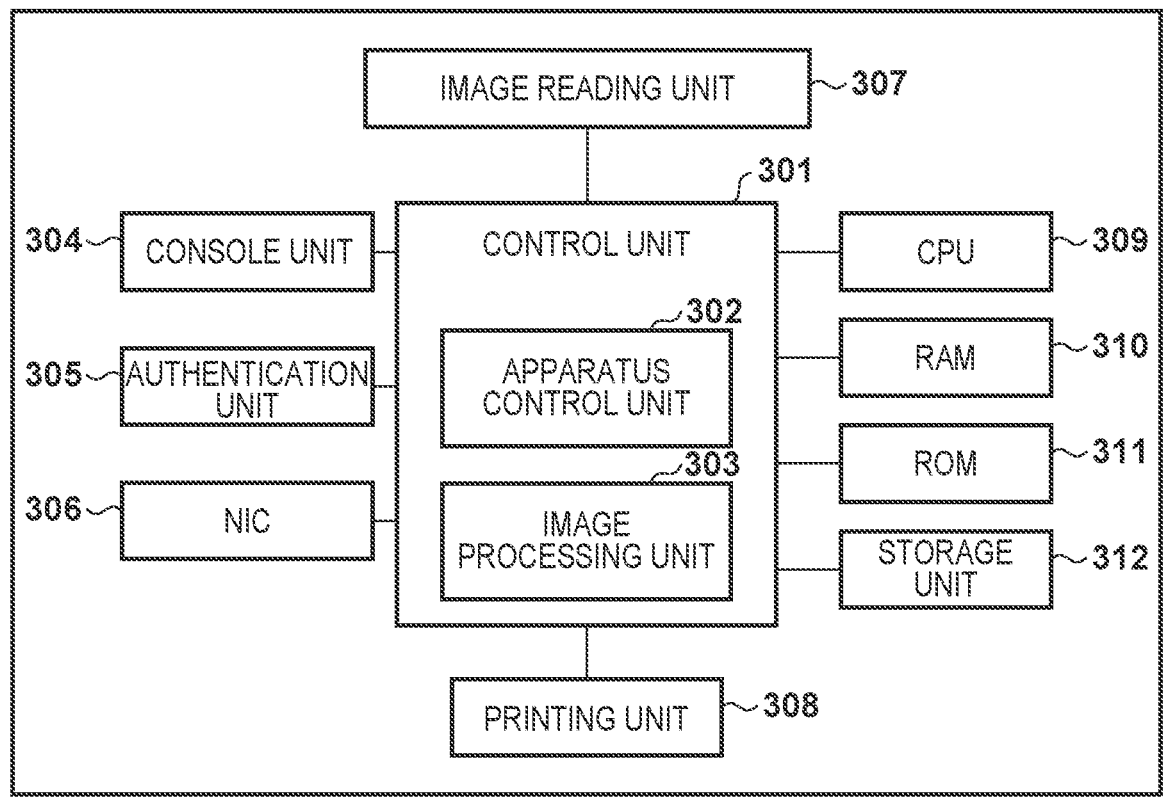
FIG. 3 is a diagram illustrating the hardware configuration of an image forming apparatus of an embodiment of the present invention.

FIG. 3 is a hardware configuration diagram of the image forming apparatuses 104, 105, 106. The image forming apparatuses 104, 105, 106 each include an console unit 304, an authentication unit 305, a NIC 306, an image reading unit 307, a printing unit 308, a CPU 309, a RAM 310, a ROM 311, and a storage unit 312 connected via a control unit 301. The control unit 301 includes an apparatus control unit 302 that executes overall control of the image forming apparatus and an image processing unit 303 that processes image data. The control unit 301 may also include a CPU or other hardware necessary to implement the apparatus control unit 302 and the image processing unit 303 via software. The console unit 304 is, for example, constituted by a software keyboard, a touch panel, or a similar input apparatus and allows for various types of setting values to be input and displayed. The CPU 309 executes a program stored in the ROM 311 or an application loaded onto the RAM 310 from the storage unit 312. In other words, the CPU 309 functions as the processing units by executing programs stored in a storage medium that is readable by the CPU 309. The RAM 310 is a main memory of the CPU 309 and functions as the working area or the like. The image reading unit 307 is constituted by a scanner or the like and is capable of acquiring an image data format document image by reading a paper document.

The control unit 301 provides a document image in the storage unit 312 to the console unit 304 and executes processing to output the document image on the console unit 304. Also, in a similar manner, the control unit 301 provides the printing unit 308 with a document image stored in the storage unit 312, and the printing unit 308 executes processing to output an document image of various formats. For example, the printing unit 308 is capable of executing processing to output image data associated with a document image to a storage medium. Also, the image forming apparatuses 104, 105, 106 are capable of connecting to the network via the NIC 306 and transmitting and receiving data. Data obtained via the NIC 306 is able to be displayed on the console unit 304.

Software Configuration

FIG. 4 is a software configuration diagram of the CMS 100 and the information processing apparatuses 101, 102. The color management system (CMS) 100 is as follows. The CMS 100 includes a device management unit 401, a color verification settings management unit 402, a color verification processing unit 403, a communication unit 404, and a web page generation unit 405. The CMS 100 is a cloud service that operates using a hardware resource on the cloud. The processing units executes processing in response to requests from the client and transmit a response to the client. Note that in the present embodiment, the CMS 100 is a cloud service. However, as long as similar processing is able to be executed, the CMS 100 may be implemented on the server side in a cloud service type system.

The device management unit 401 sets and manages the various information for the image forming apparatus that is the target of color state management. The color verification settings management unit 402 sets and manages the reference color information required for executing color verification of the image forming apparatus and the color verification job described below. The color verification processing unit 403 verifies whether or not the color of the image forming apparatus is normal on the basis of the reference color information managed by the color verification settings management unit 402 and the color information obtained from the output result of the image forming apparatus. The communication unit 404 executes reception of various types of processing requests from the information processing apparatuses 101, 102 via the information processing apparatus 103 and transmission of responses to the various types of processing requests, as well as executing transmission of printing instructions to the image forming apparatuses 104, 105, 106. The web page generation unit 405 generates a web page for registration processing and color verification settings for the image forming apparatus. Also, a web page may be generated for displaying the color state of the image forming apparatus subject to verification by the color verification processing unit 403. The generated web page is accessed from a web browser of the information processing apparatus.

Device management information 406 is a database for storing information of the image forming apparatus managed by the device management unit 401. Color verification settings information 407 is a database for storing the reference color information for executing color verification managed by the color verification settings management unit 402. Color verification job information 408 is a database for storing the color verification job settings which include the target device for color verification and the verification reference color verification settings associated together. After executing color verification via the color verification processing unit 403, the date and time information is also stored in the color verification job.

The information processing apparatus 101 that executes workflow management is as follows. A printing workflow application 409 is a program module executed by the CPU 201 that is installed and operates on the HDD 204 of the information processing apparatus 101 and loaded onto the RAM 203 when executed. A UI unit 410 builds the graphical user interface (GUI) and receives various types of input operations from the user and sends instructions to execute the corresponding processing. A print job management unit 411 accesses print job information data described below and executes referencing of various types of information of the print job the printing workflow application transmits to the image forming apparatus. A print job control unit 412 controls executing various functions (print job transmission, editing, deleting, and the like) relating to the print job in the printing workflow application. A print processing unit 413 transmits contents data and job ticket data to the image forming apparatus in response to a print job transmission instruction received from the print job control unit 412. A device management unit 414 accesses device information data described below and manages various types of information (identification name, address, and the like) of the image forming apparatus to which a print job is transmitted to from the printing workflow application.

Print job information data 415 is a database for managing information relating to the print job described below. Device information data 416 is a database for managing various types of information of the device the printing workflow application is managing as the transmission destination of the print job. The print job information data 415 and the device information data 416 are not only configured to store information in the HDD 204 of the information processing apparatus 101, but may also be configured to use another information processing apparatus (database server or the like) connected to the network as the storage destination. A web browser 417 is a program module executed by the CPU 201 that is installed and operates on the HDD 204 of the information processing apparatus 101 and loaded onto the RAM 203 when executed. The web browser 417 is used to access the CMS 100 in accordance with HTTP and execute various types of processing.

The information processing apparatus 102 that executes color measurement is as follows. A color measurement tool 418 is a program module executed by the CPU 201 that is installed and operates on the HDD 204 of the information processing apparatus 102 and loaded onto the RAM 203 when executed. A color measuring unit 419 uses a color measuring device connected to the information processing apparatus 102 to measure the color of the printed article for measurement output from the image forming apparatus and acquire color information as the color measurement. A communication unit 420 transmits the color information acquired by the color measuring unit 419 to the CMS 100. Note that the information processing apparatus 102 also includes a non-illustrated web browser and is capable of providing to an operator a user interface for transmitting and receiving instructions, replies, and other information to and from the CMS 100.

Process of Registration in Color Management System

FIG. 5 is a flowchart illustrating a registration process for registering, in the CMS 100, an image forming apparatus to have its color state managed by the CMS and color verification settings for executing color verification.

In step S501, the web browser 417 of the information processing apparatus 101 executes access of the settings screen of the CMS. When the URL of the settings screen of the CMS is entered into the web browser 417 by an operator and an instruction to execute is received, the web browser 417 transmits an acquisition request for the settings screen indicated by the URL to the CMS 100.

In step S502, the web page generation unit 405 of the CMS 100 transmits the web page of the settings screen as a reply to the information processing apparatus 101, i.e., the request source. The communication unit 404 acquires the web page of the settings screen of the CMS from the web page generation unit 405 on the basis of the received request and transmits the web page.

Figure 6A:
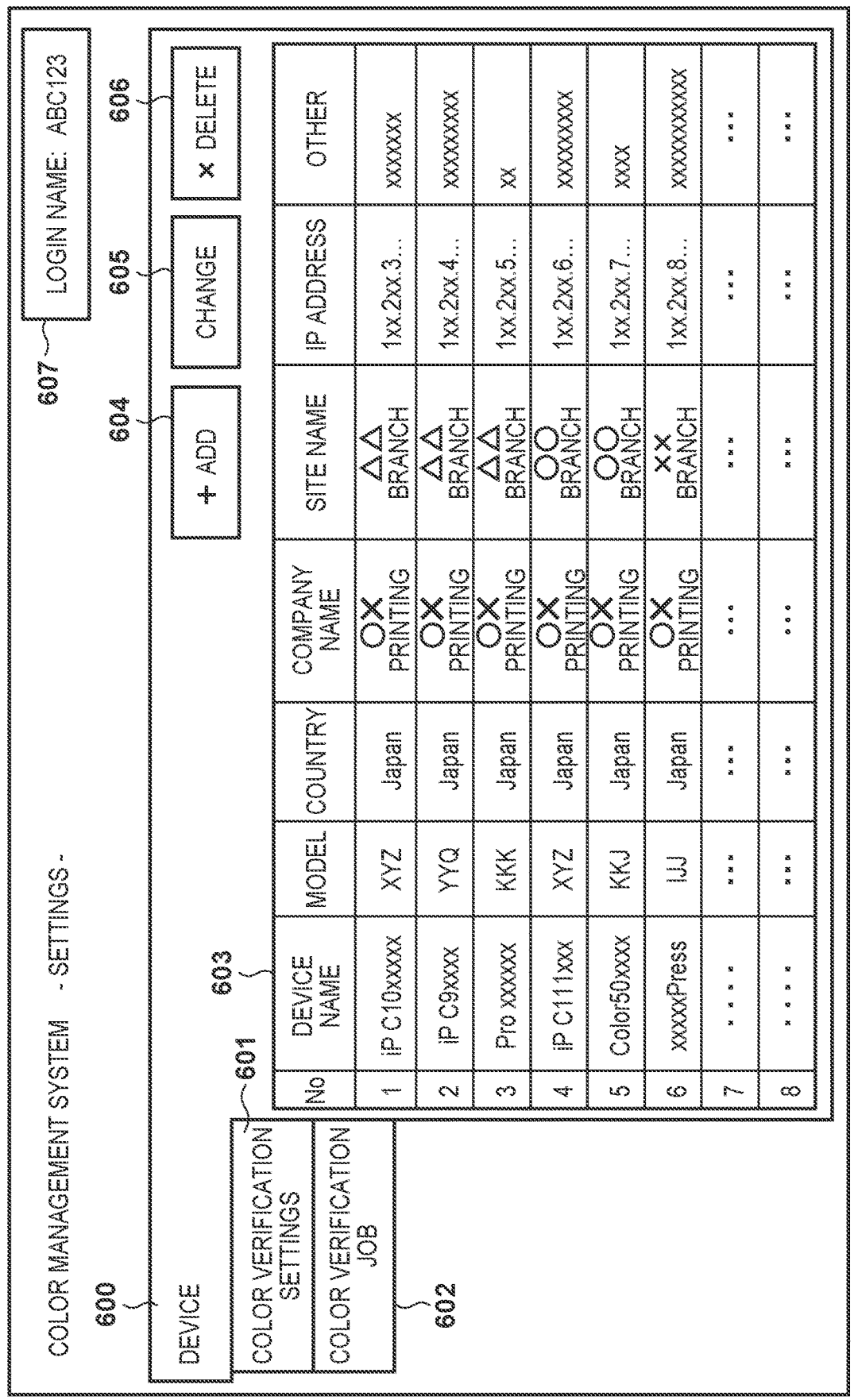
FIG. 6A is a diagram illustrating an example of a device settings screen of a color management system of an embodiment of the present invention.

In step S503, the web page of the settings screen of the CMS transmitted in step S502 is displayed on the web browser 417. FIGS. 6A to 6I are diagrams illustrating examples of the settings screen of the CMS. FIG. 6A illustrates an example of a settings list screen of the settings screen of the CMS in which the settings of the device registered in the CMS are displayed. Note that the screen illustrated in FIG. 6A corresponds to the initial screen of the settings screen of the CMS. In step S503, the screen illustrated in FIG. 6A is displayed on the web browser.

In FIG. 6A, sheet 600 is a menu item for displaying the device settings, sheet 601 is a menu item for displaying the color verification settings, and sheet 602 is a menu item for displaying the color verification jobs. The operator can set it to the item by selecting the tab of the corresponding sheet. FIG. 6A is an example of the device settings sheet, and this sheet is also referred to as the device settings screen. The device settings sheet (to be also referred to as a device settings screen) 600 includes a device list 603; various buttons including an add button 604, a edit button 605, a delete button 606; and a logged in user name 607. The device list 603 displays a list of the registered device settings per device. The add button 604 is a button for newly registering a device setting into the CMS. The edit button 605 is a button for editing the contents of a registered device setting. The delete button 606 is a button for deleting a registered device setting. The logged in user name 607 displays the name of the user logged into the CMS. Information set via the device add screen described below is displayed in the device list 603. Note that the device settings displayed in the device list 603 may be changed by the user logged into the CMS. For example, a device list 609 illustrated in FIG. 6B displays a device list for when a user Imn456, different from the logged in user ABC123 in FIG. 6A, is logged in. The displayed device list is filtered according to the privileges of the logged in user from the device settings registered in the CMS. For example, because the logged in user ABC123 belongs to the ○× printing company, only the device settings of the ○× printing company are displayed (FIG. 6A). Also, because the logged in user Imn456 belongs to □□ Printing, only the device settings of □□ Printing are displayed (FIG. 6B).

In step S504, the web browser 417 of the information processing apparatus 101 receives a report from the UI unit 410 that there has been an instruction to execute device registration processing. FIG. 6C illustrates an example of a device add screen displayed when the add button 604 is pressed (or touched). The device add screen includes input fields including device name 610, model 611, country 612, company name 613, site name 614, IP address 615, and other 616. In this example, the IP address 615 is the IP address of the image forming apparatus and is information necessary for accessing the image forming apparatus from the information processing apparatus 101. When the various types of information of the image forming apparatus to be registered is entered and an OK button 617 is pressed, in step S504, the web browser 417 receives notice that there has been an instruction to execute device registration processing. Note that when a cancel button 618 is pressed, device registration processing is cancelled and the screen returns to the previous screen (FIG. 6A).

In step S505, the web browser 417 transmits, to the CMS, the various types of information set on the device add screen in response to an instruction.

In step S506, the CMS 100 receives the device settings information and registers the device settings information in the device management information 406. The device management unit 401 receives the device settings information received in step S505 via the communication unit 404 and registers this in the device management information 406 on the basis of the received information. Table 1 is an example of data stored in the device management information 406. The various types of device settings information specified in step S504 are stored as the device management information 406. Note that the device settings (ID, device name, model, country, company name, site name, host address, IP address, other) of all of the devices managed by the CMS 100 are stored in the device management information 406. Also, note that the host address corresponds to the IP address of the proxy server (information processing apparatus 103) acting as an intermediary for connection with the CMS 100. The information of the IP address of the proxy server corresponding to the transmission destination of the device settings information received in step S506 is registered together with the device management information 406.

TABLE 1

| ID | Device name | Mode 1 | Country | Company name | Site name | Host address | IP address | Other |
|---|---|---|---|---|---|---|---|---|
| A1 | iP C10xxxxx | XYZ | Japan | ox Printing | ΔΔ Office | 1xx.23x.4xx | 1xx.2xx.3 xx | xxxxxxx |
| A2 | iP C9xxxx | YYQ | Japan | ox Printing | ΔΔ Office | 1xx.23x.4xx | 1xx.2xx.4xx | xxxxx |
| A3 | Pro xxxxxx | KKK | Japan | ox Printing | ΔΔ Office | 1xx.23x.4xx | 1xx.2xx.5xx | xx |
| A4 | iP C111xxx | XYZ | Japan | ox Printing | oo Office | 1xx.23x.4xx | 1xx.2xx.6xx | xxxxxxxx |
| A5 | Color50xxxx | KKJ | Japan | ox Printing | oo Office | 1xx.23x.4xx | 1xx.2xx.7xx | xxxx |
| A6 | xxxxxPress | IJJ | Japan | ox Printing | xx Office | 1xx.24x.4xx | 1xx.2xx.8xx | xxxxxxx |
| A7 | iP C12 xxxxx | XYZ | Japan | □□ Printing | ΔΔ Factory | 1xx.33x.3xx | 1xx.3xx.3xx | xxxxxxxx |
| A8 | Pro xxxxxx | KKK | Japan | □□ Printing | ΔΔ Factory | 1xx.33x.3xx | 1xx.3xx.4xx | xxxxxxxx |
| A9 | Cpress xxx | MMA | Japan | □□ Printing | oo Factory | 1xx.34x.3xx | 1xx.3xx.5xx | xxxxxxxx |
| A10 | iPress Cxxx | MML | Japan | □□ Printing | oo Factory | 1xx.34x.3xx | 1xx.3xx.6xx | xxxxxxxx |

In step S507, the web browser 417 of the information processing apparatus 101 receives a reply from the CMS 100 and also receives a report from the UI unit 410 that there has been an instruction to execute registration processing of the color verification settings. FIG. 6D illustrates an example of a settings screen displaying the color verification settings registered in the CMS 100. When a color verification settings menu 601 is selected, a screen displaying the color verification settings is displayed. FIG. 6D is an example of this screen. A color verification settings list 619 is a list displaying the registered color verification settings. A create button 620 is a button for newly creating a color verification setting in the CMS. The edit button 621 is a button for editing the contents of a registered color verification setting. The delete button 622 is a button for deleting a registered color verification setting. The color verification settings list 619 includes the color verification setting name, a reference profile identification name, a tolerance value of difference from reference value, company name, and other fields.

Figure 6E:
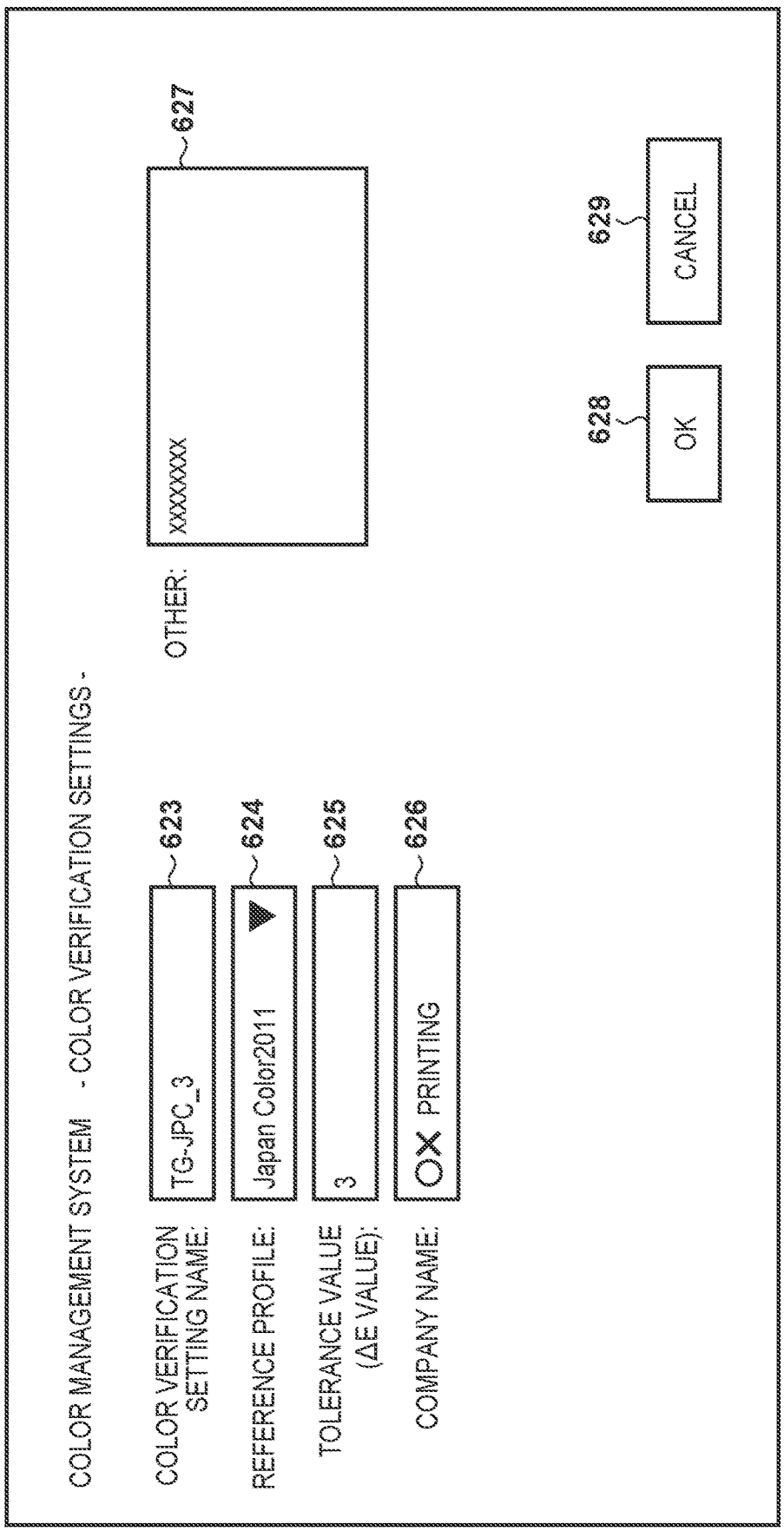
FIG. 6E is a diagram illustrating an example of a color verification settings screen of a color management system of an embodiment of the present invention.

When the create button 620 is pressed on the settings screen 601 for the color verification setting, the color verification settings creation screen illustrated in FIG. 6E is displayed. This screen includes input fields including color verification setting name 623, reference profile 624, tolerance value 625, company name 626, and other 627. The color verification setting name 623 is a setting name for uniquely identifying the color verification setting to register and is a discretionary value. The reference profile 624 indicates the color profile used when verifying the color of the device. The tolerance value 625 indicates a tolerance value used when evaluating the color measurement value obtained by comparing the color information of the color profile set in the reference profile 624 and the color information obtained by measuring the color of the output result of the device. For the tolerance value, ΔE is used to indicate the color difference. In the color verification processing described below, in a case where the color difference between measurement color of the reference profile and that of the device is within the tolerance value, the color of the device is determined to be in a normal state. Note that in a case where the tolerance value 625 is blank, no tolerance value is used (ΔE=0, i.e., no error in color difference in verification is tolerated). The company name 626 and the other 627 are set as discretionary values. When the information of the color verification setting to be registered is entered and an OK button 628 is pressed, the web browser 417 receives notice that there has been an instruction to execute registration processing of a color verification setting from a UI 410. Note that when a cancel button 629 is pressed, color verification setting registration processing is cancelled and the screen returns to the previous screen (FIG. 6D).

In step S508, the various types of information set in the color verification setting screen is transmitted by the web browser 417 to the CMS in response to the instruction.

In step S509, the color verification setting information received by the CMS 100 is registered in the color verification settings information 407. The color verification settings management unit 402 receives the color verification setting information received in step S508 via the communication unit 404 and registers this in the color verification settings information 407 on the basis of the received information. Table 2 is an example of data stored in the color verification settings information 407. The various types of color verification setting information specified in step S507 are stored. Note that all of the types of color verification setting information (ID, color verification setting name, reference profile, tolerance value, company name, other) managed by the CMS 100 are stored in the color verification settings information 407.

TABLE 2

| ID | Color verification setting name | Reference profile | Tolerance value | Company name | Other |
|---|---|---|---|---|---|
| B1 | TG-JPC_3 | JapanColor2011 | ΔE ± 3 | ox Printing | xxxxxxx |
| B2 | TG-FG_5 | Fogra coated | ΔE ± 5 | ox Printing | Xxxxxxxx |
| B3 | TG-JPC_0 | JapanColor2011 | — | ox Printing | Xxxxxxxx |
| B4 | TG-JPC_4 | JapanColor2011 | ΔE ± 4 | □□ Printing | Xxxxxxx |
| B5 | TG-FG_5 | Fogra coated | ΔE ± 5 | □□ Printing | xxxxxxxx |

In step S510, the web browser 417 receives a reply from the CMS 100 and also receives a report that there has been an instruction to execute creation processing of a color verification job. FIG. 6F illustrates an example of a settings screen displaying the color verification job registered in the CMS 100. When a color verification job menu 602 is selected, a screen displaying the color verification jobs is displayed. On the screen, a color verification job list 630 is a color verification job list displaying the registered color verification jobs. A create button 631 is a button for newly creating a color verification job in the CMS. An edit button 632 is a button for editing the contents of a registered color verification job. A delete button 633 is a button for deleting a registered color verification job. A transmit button 634 is a button for executing transmission of a print job for color measurement necessary for color verification of the specified color verification job. A color verification execute button 635 is a button for executing the specified color verification job. The processing flow of color verification will be described below.

When the create button 631 is pressed on the settings screen for the color verification job, the color verification job creation screen illustrated in FIG. 6G is displayed. This screen includes color verification job name 636, target device 637, reference color verification setting 638, execution timing 639, other input field 644, and a checkbox 642 indicating whether or not to set an effective period for the latest verification result. Here, in step S506, the target device 637 is in the format of being specified by being selected from device names of device settings information registered in the CMS. Also, the reference color verification setting 638 is in the format of being specified by being selected from color verification setting names of color verification setting information registered in the CMS in step S509.

The execution timing 639, for example, is in the format of being specified by being selected from "automatic" where jobs are automatically executed by the operator and "periodic" where jobs are executed at periodic intervals by the CMS. In other words, the color verification job can be executed at timing of "automatic" or "periodic". In a case where "periodic" is selected, a periodic interval 640 and a time 641 are able to be set. In the periodic interval 640, a numerical value indicating how many days between executions is specified, and in the time 641, the time that which the color verification job is executed is specified. Note that in a case where color verification jobs are executed a number of times in one day, a plurality of times 641 are set. In a case where the checkbox 642 for setting an effective period for the latest verification result is checked, an effective period 643 is able to be set. By setting the effective period 643, the latest color verification result can be nullified when, from the time the latest color verification was executed, the set effective period has elapsed. This setting is to prevent a color verification result of normal from remaining valid even when color verification has not been executed for a device since it received a normal color determination at the color verification executed at time ago. In a case where a new color verification result has not been transmitted even though the effective period has elapsed since the last color verification time.

When the information of the color verification job to be registered is entered and an OK button 645 is pressed, the web browser 417 receives notice that there has been an instruction to execute registration processing of a color verification job. Note that when a cancel button 646 is pressed, color verification job registration processing is cancelled and the screen returns to the previous screen (FIG. 6F).

In step S511, the web browser 417 transmits, to the CMS, the various types of information set at the color verification job screen in response to an instruction.

In step S512, the color verification job information received by the CMS 100 is registered in the color verification job information 408. The color verification settings management unit 402 receives the color verification job information received in step S511 via the communication unit 404 and registers this in the color verification job information 408 on the basis of the received information. Tables 3-1 and 3-2 illustrate an example of data stored in the color verification job information 408. In step S512, the various types of color verification job information specified in step S510 are stored. Note that all types of color verification job information (ID, color verification job name, target device, reference color verification setting, execution timing, periodic interval, time, effective period, verification result (latest), verification time, other) managed by the CMS 100 are stored in the color verification job information 408. Also, history information of the verification result of each color verification job is stored in the color verification job information 408, as in the data example in Table 4. In this example, the history of the verification result and the verification time of color verification jobs (iP C10_fixed period).

TABLE 3-1

| ID | Color verification job name | Target device | Reference color verification setting | Execution timing |
|----|---|---|---|---|
| C1 | iP C10_Fixed period | iP C10xxxx | TG-JPC_3 | Fixed period |
| C2 | iP C9_Manual | iP C9xxxx | TG-JPC_3 | Manual |
| C3 | Pro xxx_Manual | Pro xxxxxx | TG-JPC_3 | Manual |
| C4 | Color50x_Fixed period | Color50xxx | TG-JPC_0 | Fixed period |
| C5 | xxPress_Fixed period | xxxxxPress | TG-JPC_0 | Fixed period |

TABLE 3-2

| ID | Periodic interval | Time | Effective period | Verification result (latest) | Verification time (latest) | Other |
|----|---|---|---|---|---|---|
| C1 | 1 | 8:30 | 24 | Pass | Oct. 25, 2020 8:46 | xxxxxxx |
| C2 | — | — | 24 | Fail | Oct. 25, 2020 7:48 | xxxxxxx |
| C3 | — | — | — | Pass | Oct. 25, 2020 8:25 | xxxxxxx |
| C4 | 2 | 7:00 | 12 | Pass | Oct. 24, 2020 7:15 | xxxxxxx |
| C5 | 1 | 10:00 | 12 | Pass | Oct. 25, 2020 10:13 | xxxxxxx |

TABLE 4

| ID | Color verification job name | Verification result | Verification time |
|----|---|---|---|
| 1 | iP C10_Fixed period | Pass | 2020 Oct. 21 8:46 |
| 2 | iP C10_Fixed period | Fail | 2020 Oct. 22 8:47 |
| 3 | iP C10_Fixed period | Pass | 2020 Oct. 22 9:15 |
| 4 | iP C10_Fixed period_ | Pass | 2020 Oct. 23 8:42 |
| 5 | iP C10_Fixed period | Pass | 2020 Oct. 24 8:45 |
| 6 | iP C10_Fixed period | Pass | 2020 Oct. 25 8:46 |

Figure 7B:
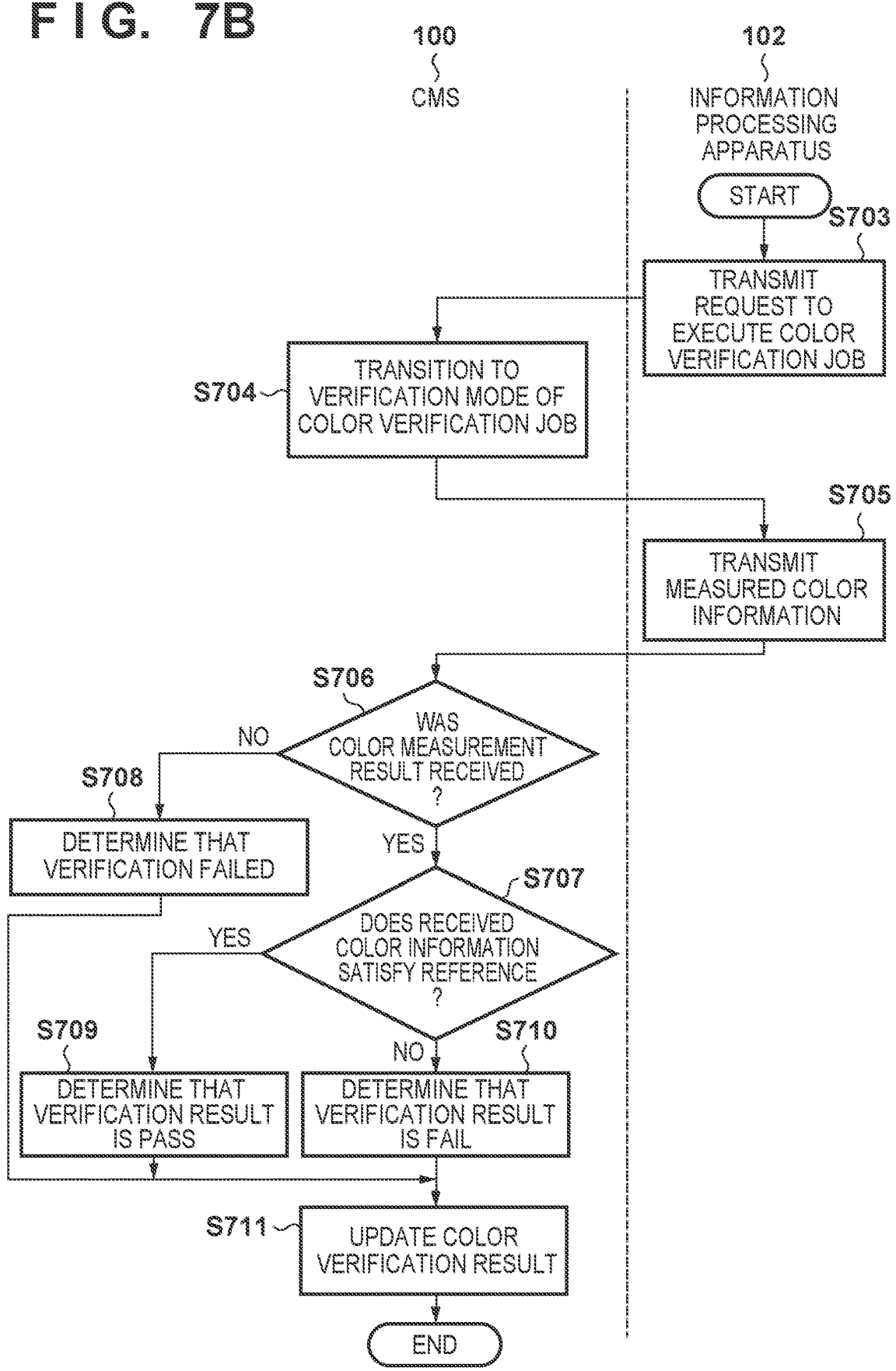
FIG. 7B is a flowchart illustrating color verification processing of an embodiment of the present invention.

FIGS. 7A and 7B are flowcharts illustrating color verification process of the image forming apparatus by the CMS 100. The color verification process is a series of flows including two processing flows of a printing processing of a job for color measurement necessary for executing color verification and color verification processing after color measurement of an output sheet. FIG. 7A is a flowchart illustrating the former processing, and FIG. 7B is a flowchart illustrating the latter processing.

Executing a Job for Color Measurement

In step S701 of FIG. 7A, the CMS 100 receives a transmission instruction to execute transmission of a job for color measurement for a color verification job that the CMS 100 executes color verification. The color verification job screen illustrated in FIG. 6F is accessed from the web browser of the information processing apparatus 102 for executing color measurement. When the screen of FIG. 6F is displayed on the information processing apparatus 102, a color verification job to be executed for color verification is selected by the operator, and the job for color measurement transmit button 634 is pressed, the identification name of the selected color verification job is transmitted to the CMS 100. This is received by the CMS.

Next, the color verification processing unit 403 of the CMS 100 accesses the color verification job information 408 of Tables 3-1 and 3-2, the color verification settings information 407 of Table 2, and the device management information 406 of Table 1 and generates a print job for executing the selected target color verification job and transmits this to the target device. For example, in a case where the color verification job with the ID of C1 for the color verification job information 408 illustrated in Tables 3-1 and 3-2 is specified, the target device is iP C10xxxxx, and the reference color verification setting is TG-JPC_3. Also, the color verification setting name of TG-JPC_3 for the color verification setting name of the color verification settings information 407 has the corresponding reference profile of Japan-Color2011 as illustrated in Table 2. Thus, a print job is generated with a color patch for color measurement marked with a color bar of CMYK, gray, and the like for verification of the color of JapanColor2011. Also, the host address of 1xx.23x.4 and the IP address of 1xx.2xx.3 . . . is acquired from the device management information 406 illustrated in Table 1 and transmitted to the acquired destination of the generated print job.

Next, in step S702, output of a print job with a color patch for color measurement received by the image forming apparatus is executed. The operator uses an output color patch for color measurement sheet and starts the processing for color measurement and color verification. Note that in the present embodiment, the print job of a color patch for color measurement is transmitted from the CMS 100 to the target image forming apparatus. Alternatively, instead of the print job being transmitted from the CMS 100 directly to the image forming apparatus, data (a PDF file, for example) of the color patch for color measurement may be downloaded onto the information processing apparatus. In this case, a method of printing from the information processing apparatus to the image forming apparatus using a printer driver or the like may be used.

Color Verification Processing

In step S703 of FIG. 7B, at the web browser of the information processing apparatus 102, in response to a color verification execute button 635 being pressed by the operator to specify the color verification job for executing color verification, a request to execute the target color verification job is transmitted to the CMS 100.

Next, in step S704, the color verification processing unit 403 of the CMS 100 transitions to a verification mode for the target color verification job and replies to the information processing apparatus 102 with the verification execution screen of the color verification job. FIGS. 6H and 6I illustrate examples of the verification execution screen of the color verification job. The verification execution screen includes in-progress color verification job information 647, color measurement information 648 displaying information obtained from color measurement, and result information 649 displaying the color verification result. The color verification job information 647 displays various types of information (color verification job name, target device, reference profile, and the like) of the in-progress color verification job obtained from the color verification job information 408, the color verification settings information 407, and the device information 406. The color measurement information 648 displays verification item details of the in-progress color verification job and their reference values and values obtained from color measurement from the color patch for color measurement described below. The result information 649 displays the color verification status and result. Step S704 takes place before color measurement is executed, and thus the screen is in the state of the verification execution screen illustrated in FIG. 6H. In other words, the values of the measurement items have not been measured, and thus the fields are blank, and in-progress is displayed on the result information 649. Note that the previous screen (FIG. 6F) can be returned to by pressing a close button 650. However, it may also be configured to cancel the color verification processing in a case where the close button 650 is pressed during color verification.

Next, in step S705, the information processing apparatus 102 executes the color measurement tool 418 and measures the color of the printed article of the color patch for color measurement with a color measurement device. The color information obtained by the color measuring unit 419 via color measurement is transmitted to the CMS 100 via the communication unit 420.

Next, in step S706, it is determined whether or not the color information obtained via color measurement transmitted from the information processing apparatus 102 has been received. In a case where the color information obtained via color measurement by the color verification processing unit 403 it determined to have been successfully received, the process proceeds to step S707. In a case where the color information has not been received or it is determined that the received color information is defective, the process proceeds to step S708.

Next, in step S707, it is determined whether or not the color information received by the color verification processing unit 403 satisfies the reference. In order to determine this, the measurement values of the color information received by the color verification processing unit 403 are compared with the reference values item by item, for example. In a case where, as a result of the comparison, all of the measurement values are within the tolerance values, it is determined that the reference values are satisfied, and the process proceeds to step S709. On the other hand, in step S707, in a case where the measurement value of the color information for any one of the items is not within the tolerance values, it is determined that the reference values are not satisfied, and the process proceeds to step S710. Note that the measurement value being within the tolerance value means: |measurement value−reference value|≤tolerance value, and the reference being satisfied means that the measurement values for all of the measurement items are within the tolerance value. In step S707, whether or not the inequality equation described above is satisfied should be determined for all of the measurement items.

In a case where in step S706, it is determined that the color measurement result could not be received, in step S708, the color verification processing unit 403 of the CMS 100 determines that the color verification result is a verification failure. Note that a reception failure may be determined when a timer started in step S704 times out. In other words, a color measurement result being unable to be received means that the color measurement result could not be received within a predetermined amount of time. Also, verification failure does not mean that the color of the target image forming apparatus is not normal, verification failure means that the color verification processing could not be normally executed due to the communication state, an operator mistake, or the like. Thus, when there is a verification failure, the process may transition to executing another attempt at color measurement.

In a case where it is determined in step S707 that the received measurement values satisfy the references, in step S709, the color verification processing unit 403 of the CMS 100 determines that the color verification result is a verification pass (in other words, good performance). A verification pass means that the color of the target image forming apparatus is in a state in which the color defined by the reference profile can be accurately reproduced.

Next, in step S710, the color verification processing unit 403 of the CMS 100 determines that the color verification result is a verification fail (in other words, bad performance). A verification fail means that the color of the target image forming apparatus is in a state in which the color defined by the reference profile cannot be accurately reproduced. This corresponds to a case of |measurement value−reference value|>tolerance value for at least one of the measurement items, for example.

The verification result in steps S708 to S710 is transmitted to the information processing apparatus 102, and the verification execution screen displayed by the web browser is updated. The transmission timing may be just before or after step S711. FIG. 6I illustrate an example of the verification execution screen after color verification has been executed. The values of the color information obtained via color measurement are displayed as measurement values in the items of measurement information 651, and the color verification result is displayed in as result information 652.

Next, in step S711, on the basis of the color verification result determined in step S708, step S709, and step S710 by the color verification processing unit 403, the color verification processing unit 403 accesses the color verification job information 408 (see Tables 3-1 and 3-2) and updates the information of the verification result of the target color verification job. The color verification processing unit 403 registers the verification result and the time in "verification result (latest)" and "verification time (latest)" of the target color verification job of the color verification job information 408 described above. Also, the verification result and the time are registered in "verification result" and "verification time" of the history information of the verification result of the color verification job information 408 described above for the target color verification job.

Print Job Transmission Processing

FIG. 8 is a flowchart illustrating the transmission processing of a print job in the printing workflow application. The printing workflow application is an application for managing the production process of the printed article in the production lines. The production of a printed article includes a plurality of processes including submitting document data corresponding to the original document, generating and executing a print job, generating and executing a post-processing job, quality control, adjusting processes by the operator, and the like. The printing and post-processing may include production of each component of the printed article, bookbinding or integrating the components, and the like. Of these, acquisition of color verification information by the information processing apparatus and transmission processing of the print job will be described using FIG. 8.

In step S801, the device management unit 414 of the information processing apparatus 101 transmits, to the CMS 100, a request to acquire information of the color verification result of the device registered in the device information data 416. FIG. 9 illustrates an example of a print job management screen of the printing workflow application. When there is an instruction to execute an executable file of the printing workflow application from the operator, a program is loaded onto the RAM 203, and the apparatus control unit 302 displays the print job management screen on the display 207. As illustrating in FIG. 9, a print job list 901 displays a list of print jobs managed by the printing workflow application. The printing workflow application accesses, via the print job management unit 411, information of the print job stored in the print job information data 415 and displays the print job to be printed in the print job list. However, access is only allowed if the logged in user has the necessary privileges, for example. A print button 902 is a button for sending an instruction to execute the selected print job, and a delete button 903 is a button for deleting the selected print job. The operator selects a print job displayed in the print job list using the pointing device 206 or the like, and, when the print button is pressed, a printing instruction is sent for the print job. A device list 904 displays a list of the image forming apparatuses managed as output destinations by the printing workflow application. The device list 904 displays the communication state and color verification state of the device.

The printing workflow application acquires the information of the device information data 416 via the device management unit 414 and displays a device list. An update button 905 is a button for updating the communication state and the color verification state of the device to the latest state. The communication state and the color verification state of the device are updated at periodic intervals, however by pressing the update button, update can be performed at a discretionary timing. Note that in a case where, instead of using the update button 905, updates are only performed periodically, the print job management screen of FIG. 9 may not be displayed, and the processing from step S801 to step S803 may be periodically executed.

Table 5 illustrates an example of information of the device information data 416 managed by the device management unit 414. In the device information data, information indicating the connected image forming apparatus is stored and data, such as device ID, device name, IP address, verification result (latest), speed, color, and the like, is stored. In step S801, using the information of the IP address stored in the device information data as a key, a request to acquire information of the color verification result is transmitted to the CMS 100. The target device may be all of the devices each user has access privileges for or may be a device selected in advance by the operator.

TABLE 5

| Device ID | Device name | IP address | Verification result (latest) | Speed | Color |
|---|---|---|---|---|---|
| D-01 | iP C10xxxxx | 1xx.2xx.3xx | Pass | 100 | Color |
| D-02 | iP C9xxxx | 1xx.2xx.4xx | Fail | 90 | Color |
| D-03 | Pro xxxxxx | 1xx.2xx.5xx | Pass | 160 | Color |

Next, in step S802, the color verification processing unit 403 of the CMS 100 sends the latest color verification result of the device corresponding to the received IP address as a reply. The color verification processing unit 403 of the CMS 100 may, via the communication unit 404, use the IP address of the device transmitted by the device management unit 414 of the printing workflow application and the IP address (host address) of the proxy server of the information processing apparatus 103 as keys. In this case, as keys, a device is identified from the device management information 406, and the information of the latest color verification result from the color verification job information 408 associated with the device is transmitted to the information processing apparatus 102. For example, in a case where the device has the device ID of "D-01" of the device information data 416, in step S801, transmission is executing using the IP address of 1xx.2xx.3xx and the IP address (host address) of the information processing apparatus 103 of 1xx.23x.4xx. In step S802, the device (ID of A1 and device name of iP C10xxxxx) that matches the device management information 406 is identified using the IP addresses as keys. Then, the color verification job information associated with the device is obtained from the color verification job information 408, and the ID of C1 and the color verification job name of iP C10_fixed period are identified. Next, the information (verification result (latest) is pass) of the latest color verification result of the identified color verification job is transmitted. Note that, on the basis of the stored verification time associated with the color verification result, in a case where the effective period of the set color verification result has elapsed, a reply of fail (poor performance) is sent regardless of the contents of the color verification result. Also, in such a case, a reply of "effective period expired" may be sent. In this case, the reply may be treated the same as when a reply of fail is received by the information processing apparatus 101.

Next, in step S803, the device management unit 414 receives the information of the color verification result and, on the basis of the information, updates the value of the verification result (latest) of the device information data 416. Also, together with the UI unit 410 updating the device information data 416, the display of the color verification of the device list 904 is updated.

The processing of step S801, step S802, and step S803 are executed at periodic intervals by the printing workflow application, but may be executed at a discretionary timing by pressing the update button 905. From step S804 onward may be executed at a different time period to steps S801 to S803.

In step S804, the printing workflow application receives a printing instruction for a print job. This instruction is executed from the screen of FIG. 9. By the operator selecting a discretionary print job from the print job list 901 and pressing the print button 902, the printing workflow application receives a printing instruction (execution instruction) for the selected print job.

Next, in step S805, the information of the print job with the printing instruction in step S804 is acquired from the print job information data 415 by the print job management unit 411. Tables 6-1 and 6-2 illustrate the print job information data 415. Data, such as order ID, job ID, job name, quantity, one-sided or two-sided, color, paper, content name, output destination, and the like, is stored in the print job information data.

TABLE 6-1

| Order ID | Job ID | Job name | Quantity | One-sided or two-sided | Color |
|---|---|---|---|---|---|
| O-001 | Job0001 | Manual A | 100 | Two-sided | Monochrome |
| O-002 | Job0002 | Flyer 001 | 250 | One-sided | Color |
| O-003 | Job0003 | Catalogue B | 80 | Two-sided | Color |

TABLE 6-2

| Order ID | Job ID | Paper | Content name | Output destination |
|---|---|---|---|---|
| O-001 | Job0001 | High quality paper | abc.pdf | iP C9xxxx |
| O-002 | Job0002 | Coated paper | qwer.pdf | iP C10xxxxx |
| O-003 | Job0003 | Coated paper | poiuy.pdf | iP C10xxxxx |

Next, in step S806, the print job management unit 411 determines whether or not the color verification result of the output destination of the print job to be printed acquired in step S805 is a fail. For example, in a case where the print job the printing instruction is for has the job ID of Job0001, the output destination is iP C9xxxx, and so the information of the verification result (latest) of iP C9xxxx is acquired from the device information data 416 (Table 5). In a case where the information of the acquired verification result (latest) is a pass, the process proceeds to step S812. In the case of a fail, the process proceeds to step S807. Note that in a case where the result is not pass or fail but is "null" indicating that color verification has not been executed or "failure" indicating that color verification has failed, the process proceeds to step S807.

Figure 10:
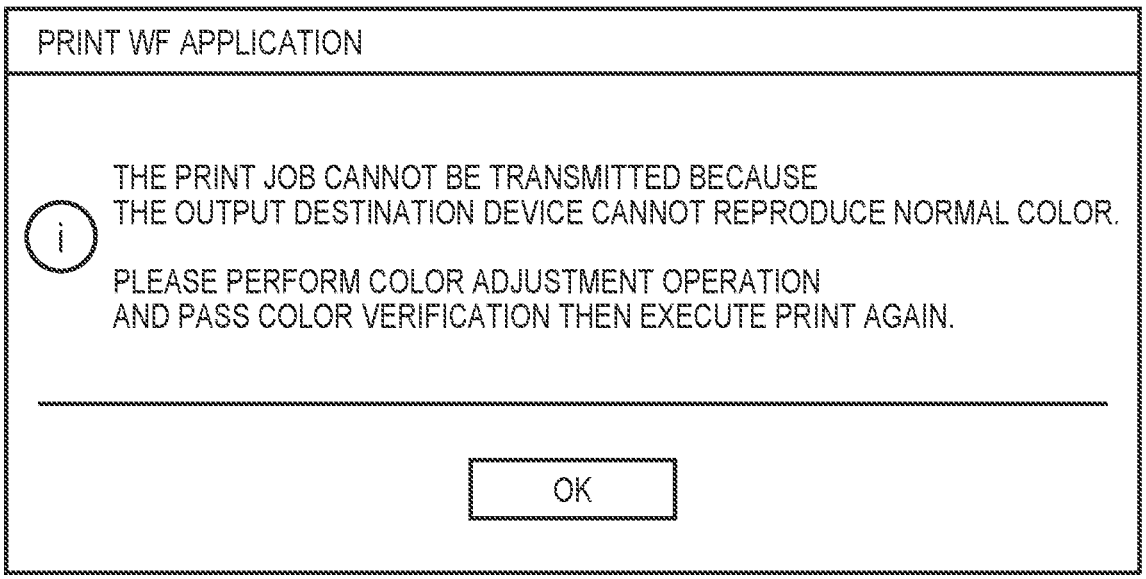
FIG. 10 is a diagram illustrating an example of a message screen of an embodiment of the present invention.

In step S807, the UI unit 410 displays a message screen indicating that the print job cannot be transmitted. FIG. 10 illustrates an example of the message screen. Because the output destination device is in a state in which color cannot be normally output, a warning message indicating that printing cannot be execute is displayed.

Next, in step S808, the print processing unit 413 determines whether or not there is an alternative device to the device with a poor color verification result. The print processing unit 413 accesses the device information data 416 via the device management unit 414 and determines whether or not there is a device that can be switch in as the output destination device for the print job acquired in step S806. In a case where, in the device information data 416, the verification result (latest) is pass and the device has the same capability as the output destination device for the print job acquired in step S806, it is determined that the alternative can be used. Whether or not the device has the same capability is determined by determining whether or not they are the same color printer by referencing the color attribute in the device information data 416, for example. In a case where they are the same color printer, they are determined to have the same capability. Also, for example, in a case where information such as the type of finisher connected to the device being the same is the same, they may be determined to have the same capability. In a case where the color attribute is used in the determination, looking at the example of the device information data 416, the device with the device name of iP C10xxxxx and the device with the device name of Pro xxxxxx may be determined to be alternatives to one another.

Figure 11:
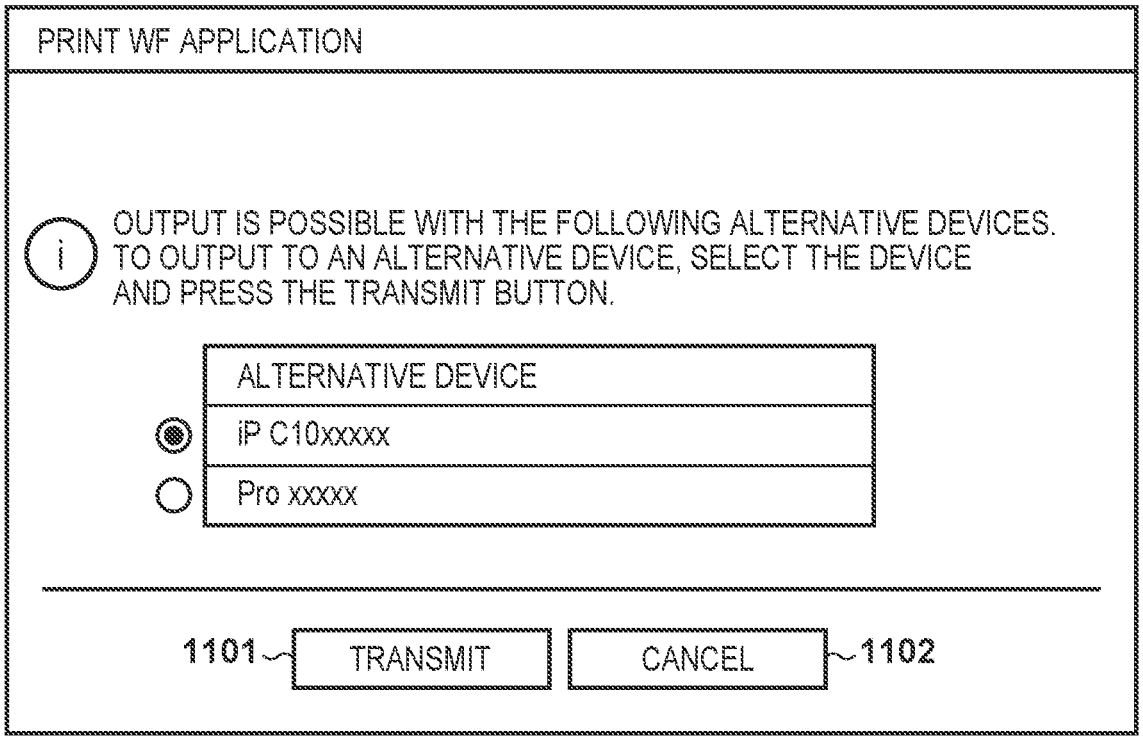
FIG. 11 is a diagram illustrating an example of an alternative device selection screen of an embodiment of the present invention.

Next, in step S809, the UI unit 410 displays the alternative device selection screen. The screen may be displayed when an OK button on the screen of FIG. 10 is touched. FIG. 11 illustrates an example of the alternative device selection screen. In this example, the two devices, iP C10xxxxx and Pro xxxxxx, are presented as alternative devices. A radio button is also displayed for selecting the alternative device.

Next, the print processing unit 413 determines whether or not printing executed using the alternative device, and in a case where printing is executed using the alternative device, the process proceeds to step S812, and in a case where printing is not executed using the alternative device, the process proceeds to step S811. On the alternative device selection screen of FIG. 11, when a displayed device being selected and a transmit button 1101 being pressed is received, it is determined that printing is executed using the alternative device. In a case where a cancel button 1102 being pressed is received, it is determined that printing is not executed using the alternative device.

In a case where the cancel button is pressed, in step S811, the print processing unit 413 cancels transmitting the print job.

In a case where the color verification result of the output device is good, in step S812, the print processing unit 413 transmits the print job to the output destination device. In step S810, in a case where the alternative device is selected, the print job is transmitted to the selected alternative device.

By the processing described above being executed, the transmission of the print job can be controlled in accordance with the color verification state of the output destination device of the print job. In a case where the color verification state of the device is one in which color cannot be accurately reproduced, transmission of a print job to the device can be stopped, thus preventing printing defects in advance. Also, in a case where there is an alternative device, on the printing workflow application side, the alternative device may be automatically searched for and, if found, presented. This can reduce the time and effort on the part of the operator.

Furthermore, because the color verification result of the device can be periodically acquired, when the print job is executed, the latest color verification result is referenced and whether the result is pass or fail can be determined. Also, in the embodiment described above, the information processing apparatus 101 that executes the printing workflow application acquires a color measurement result periodically from the CMS 100 or in response to an operation (request) by the operator. However, the color measurement is dependent on the execution of the job for color measurement, and the job for color measurement is not limited to being periodically executed. However, in a case where a configuration is used in which, as the post-processing apparatus of the image forming apparatus, a color measurement apparatus in connected in-line, because the output sheet is subject to color measurement as is, the job for color measurement can be executed without an intermediary. The color measurement apparatus may be provided with a scanner for acquiring an image of both sides of the sheet or a camera. In this manner, the captured image is transmitted to the color measurement tool 418 and color verification is executed and the result is stored in the CMS 100. With this configuration, the job for color measurement can be periodically executed at set intervals. Also, depending on the job for color measurement, the output sheet can be discharged to a tray for defects, for example, to prevent defects being mixed in with the products.

Furthermore, by setting the intervals at which the job for color measurement is executed to a shorter time than the effective period of the color verification result, the state of the image forming apparatus can be evaluated using at all times a valid color verification result.

Second Embodiment

Next, the second embodiment of the present invention will be described. Note that configurations that are the same as in the first embodiment will have their description omitted. In the second embodiment, even in the case of a device with a color verification result of fail, processing to enable execution in accordance with the color settings of the print job to be transmitted and the required quality level will be described.

Print Job Transmission Processing

Figure 12B:
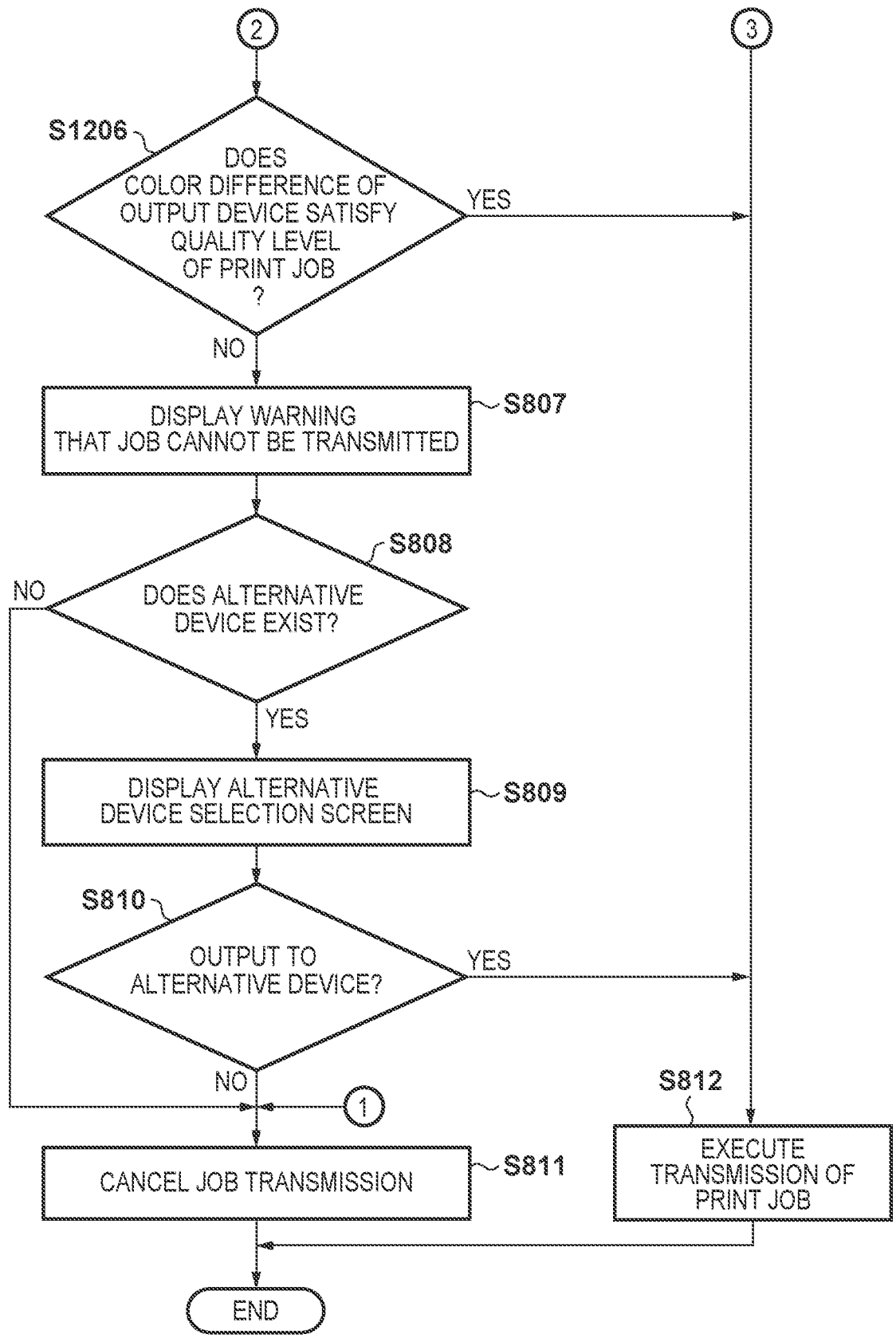

FIGS. 12A and 12B are flowcharts illustrating the transmission processing of a print job in the printing workflow application according to the second embodiment. Processing which is the same as that in FIG. 8 is given the same reference sign and description thereof is omitted.

In step S1201, on the basis of the information of the color verification result returned from the CMS 100, the device management unit 414 updates the value of the verification result (latest) of the device information data 416. In the second embodiment, in addition to the information of pass or fail for the verification result, a color difference (ΔD), which is the difference between the measurement value obtained via verification and the reference value, is also held in the color verification job information 408 of the CMS 100. Also, via the present processing, in a similar manner, information of the color difference (ΔD) is held also in the device information data 416.

Table 7 illustrates an example of the device information data 416 in which the ΔD value is held according to the second embodiment.

TABLE 7

| Device ID | Device name | IP | Color verification (latest) | ΔD value | Speed | Color |
|---|---|---|---|---|---|---|
| D-01 | iP C10xxxxx | 1xx.2xx.3xx | Pass | 3 | 100 | Color |
| D-02 | iP C9xxxx | 1xx.2xx.4xx | Fail | 8 | 90 | Color |
| D-03 | Pro xxxxxx | 1xx.2xx.5xx | Pass | 2 | 160 | Color |

As illustrated in FIG. 8, steps S801 to S1201 are periodically executed and may be executed at a different time period to the step S804 onward.

In a case where, in step S806, the color verification result is detected to be poor, in step S1202, whether or not the print job to be transmitted is a monochrome print is determined. In order to do this, the print processing unit 413 accesses the print job information data 415 via the print job management unit 411 and acquires a color setting value for the print job to be transmitted. Tables 8-1 and 8-2 illustrate an example of the print job information data 415 according to the second embodiment. In a case where the print job to be transmitted has the job ID of Job0001, as the color setting, monochrome is acquired. In a case where the color setting is monochrome, the print processing unit 413 determines the print job to be able to be transmitted, and the process proceeds to step S1202A. In a case where the color setting is not monochrome, the process proceeds to step S1205. This is because in the case of monochrome printing (printing in monochrome), it can be considered that the effect by color misregistration on the printed article is small.

TABLE 8-1

| Order ID | Job ID | Job name | Quantity | One-sided or Two-sided | Color |
|---|---|---|---|---|---|
| O-001 | Job0001 | Book A-body | 100 | Two-sided | Monochrome |
| O-001 | Job0002 | Book A-cover | 100 | Two-sided | Color |
| O-003 | Job0003 | Flyer B | 200 | Two-sided | Color |

TABLE 8-2

| Order ID | Job ID | Paper | Content name | Quality level | Output destination |
|---|---|---|---|---|---|
| O-001 | Job0001 | High quality paper | abc.pdf | Medium | iP C9xxxx |
| O-001 | Job0002 | Coated paper | qwer.pdf | Medium | iP C9xxxx |
| O-003 | Job0003 | Coated paper | poiuy.pdf | Low | iP C9xxxx |

In step S1203, regarding the print job to be transmitted and another print job of the same order, it is determined whether or not the color verification result of the output destination is a fail. The same order means having the same order ID. The order ID is identification information corresponding a single product, and print jobs for printing the plurality of components, such as a body and a cover, that made up a printed article are given a common order ID. In other words, print jobs of the same order can be considered associated together as a group of print jobs. In step S1202A, the print processing unit 413 determines whether or not there is another print job of the same order as the print job to be transmitted from the print job information data 415 (Tables 8-1 and 8-2). In a case where there is another print job of the same order, the process proceeds to step S1203 and acquires information of the output destination. In the example of FIG. 8, in a case where Job001 is transmitted, it is determined that there is also Job002 with the same order ID of O-001. Then, the output destination of Job002 of iP C9xxxx is acquired. Next, the print processing unit 413 acquires the information of the color verification (latest) of the output destination from the device information data 416 (Table 7) via the device management unit 414. In the example of Table 7, the information of fail is acquired as the result of the color verification (latest) for the output destination iP C9xxxx of Job002. In a case where the acquired information of the color verification result is a fail, the process proceeds to step S1204, and in a case where it is not a fail, the process proceeds to step S812. Note that in a case where there is not another print job of the same order as the print job to be transmitted, the process branches to step S812.

In step S1204, it is determined whether or not to print the print job to be transmitted separate from another print job of the same order. The UI unit 410 displays a message screen notifying that the image forming apparatus for executing the print jobs of the same order requires color adjustment. On this screen, a message is also displayed for confirming the execution of printing and the execution of the transmission of the print job. FIG. 13 illustrates an example of the message screen. When printing is executed, the content is for confirming that the print job will be transmitted separate from another print job of the same order. In step S1204, when that a YES button 1301 has been pressed is received by the UI unit 410, it is determined that printing is to be executed, and the process proceeds to step S812. On the other hand, when that a cancel button 1302 has been pressed is received, it is determined that printing is to be cancelled, and the process proceeds to step S811.

In a case where the print job is not monochrome, in step S1205, the quality level of the print job to be transmitted is acquired. The print processing unit 413 accesses the print job information data 415 (Tables 8-1 and 8-2) via the print job management unit 411 and acquires a quality level value for the print job to be transmitted. In a case where the print job to be transmitted has the job ID of Job0001, as the quality level, medium is acquired, and in a case of the job ID of Job0003, as the quality level, low is acquired. The quality level is specified when the client makes an order for a printed article and is transmitted, together with the quantity, sheet, and the like, from a higher level order management system (not illustrated) to the printing workflow application.

In step S1206, it is determined whether or not the color difference of the output destination device satisfies the quality level of the print job to be transmitted. The print processing unit 413 acquires the ΔD value, which is the between the measurement value of the output destination device and the reference value, from the device information data 416 (Table 7) via the device management unit 414. The ΔD value may be acquired for each measurement item. Also, the print processing unit 413 acquires the quality level for the print job to be transmitted from the print job information data 415 (Tables 8-1 and 8-2) via the print job management unit 411. Furthermore, information of an association table between the quality level stored in the print job information data 415 and the ΔD value may be acquired. Table 9 illustrates an example of information of an association table between the quality level and the ΔD value. In the example of Table 9, for example, the quality level of high is associated with the ΔD value of ±3. This means that a print job with a quality level of high requires the ΔD value of the color verification result of the output destination device to be within a ±3 range.

The association between the quality level and the ΔD value is set at a settings UI (not illustrated) of the printing workflow application. The quality table of Table 9 may be set per print job or may be set per order. The print processing unit 413 acquires the ΔD value corresponding to the quality level of the print job to be transmitted on the basis of the information of Table 9 and determines whether or not the ΔD value of the output destination device is within the acquired range of the ΔD value of the print job, i.e., equal to or less than the allowable difference. In a case where the ΔD value of the output destination is within the range of the ΔD value corresponding to the quality level of the print job, the print processing unit 413 determines that the print job can be transmitted, and the process proceeds to step S812. Otherwise, the process proceeds to step S807.

For example, in the case of the job ID of Job003 of the print job information data 415 (Tables 8-1 and 8-2), because the quality level is low, the ΔD value of the print job is ±9 as seen in Table 9. The ΔD value obtained from the measurement value of the output destination device (iP C9xxxx) and the reference value is 8 as seen in the device information data 416 (Table 7). Thus, the ΔD value (8) of the information of the output destination device is determined to be within the range of the ΔD value (±9) of the print job.

TABLE 9

| Quality level | ΔD value |
| --- | --- |
| High | ±3 |
| Medium | ±6 |
| Low | ±9 |

By executing the processing described above, even in the case of a device for which the color verification result is fail, the print job to be transmitted can be transmitted if the color setting is monochrome. Here, in a case where there is a likelihood that the print job may be transmitted separated from another print job of the same order, this can be confirmed with the operator. Then, in a case where operator confirmation has been received, the print job can be executed separated from another print job of the same order.

Also, in a case where the color setting of the print job to be transmitted is not monochrome and it is determined that the quality required for the print job is satisfied, the print job can be transmitted. Accordingly, even in a case where the color verification result of the output device is a fail, a print job highly unlikely to have problems in quality can be transmitted, allowing the efficiency of production to be increased.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-022705, filed, Feb. 16, 2021 which is hereby incorporated by reference herein in its entirety.

What is claimed is:

1. An information processing apparatus, comprising:
at least one memory; and
at least one processor, wherein the at least one memory stores at least one program that causes the at least one processor to perform operations including:
acquiring, periodically, in response to a request, or both, a color verification result of a printed article printed by an image forming apparatus from a storage storing a color measurement result of a printed article printed by the image forming apparatus;
controlling the information processing apparatus so as to perform transmission of an execution instruction of a print job to the image forming apparatus in a case where the acquired color verification result satisfies a reference; and
controlling the information processing apparatus so as not to perform transmission of the execution instruction of the print job to the image forming apparatus in a case where the acquired color verification result does not satisfy the reference, except, in a case where the acquired color verification result does not satisfy the reference but a setting value of the print job satisfies a predetermined condition, the information processing apparatus is controlled so as to perform transmission of the execution instruction of the print job to the image forming apparatus.

2. The information processing apparatus according to claim 1, wherein, in the case where the acquired color verification result does not satisfy the reference, on the basis of information of another image forming apparatus acquired from the storage, an alternative image forming apparatus with a color verification result that satisfies the reference is identified and the print job is executed by the identified alternative image forming apparatus in response to a user instruction.

3. The information processing apparatus according to claim 1, wherein it is determined that the acquired color verification result satisfies the reference in a case where a difference between a color measurement value of the printed article printed by the image forming apparatus and a reference value is within a predetermined tolerance value.

4. The information processing apparatus according to claim 3, wherein the color measurement value is measured for a plurality of printed articles and it is determined that the acquired color verification result satisfies the reference in a case where a difference between the color measurement value for all of the plurality of items and the reference value is within the tolerance value for each of the plurality of printed articles.

5. The information processing apparatus according to claim 3, wherein the operations further include setting the tolerance value.

6. The information processing apparatus according to claim 1, wherein the operations further include via the acquiring, periodically acquiring the color verification result, and setting an interval for periodic acquisition.

7. The information processing apparatus according to claim 1, wherein a verification time is associated with the acquired color verification result and stored, and it is determined that the acquired color verification result for which an effective period has elapsed since the verification time does not satisfy the reference.

8. The information processing apparatus according to claim 7, wherein the operations further include setting the effective period.

9. The information processing apparatus according to claim 1, wherein in the case where the acquired color verification result does not satisfy the reference but it is determined that the setting value of the print job is monochrome, the transmission of the execution instruction of the print job is performed.

10. The information processing apparatus according to claim 9, wherein in the case where the setting value of the print job is monochrome, if there is another related print job and the color verification result of an image forming apparatus to execute the print job does not satisfy the reference, the print job is executed in response to a user instruction.

11. The information processing apparatus according to claim 10, wherein in the case where the setting value for the print job is monochrome, if there is the other related print job and the color verification result of an image forming apparatus to execute the print job does not satisfy the reference, a user is notified of this and an instruction of whether or not to execute the print job is received.

12. The information processing apparatus according to claim 1, wherein, even in the case where the acquired color verification result does not satisfy the reference, the information processing apparatus is controlled so as to perform transmission of the execution instruction of the print job to the image forming apparatus according to a quality level required in the print job.

13. A printing system, comprising:
   an information processing apparatus;
   a color management system including a storage; and
   an image forming apparatus, wherein the information processing apparatus includes:
      at least one memory; and
      at least one processor, wherein the at least one memory stores at least one program that causes the at least one processor to perform operations including:
         acquiring, periodically, in response to a request, or both, a color verification result of a printed article printed by an image forming apparatus from the storage storing a color measurement result of a printed article printed by the image forming apparatus;
         controlling the information processing apparatus so as to perform transmission of an execution instruction of a print job to the image forming apparatus in a case where the acquired color verification result satisfies a reference; and
         controlling the information processing apparatus so as not to perform transmission of the execution instruction of the print job to the image forming apparatus in a case where the acquired color verification result does not satisfy the reference, except, in a case where the acquired color verification result does not satisfy the reference but a setting value of the print job satisfies a predetermined condition, the information processing apparatus is controlled so as to perform transmission of the execution instruction of the print job to the image forming apparatus.

14. A non-transitory computer-readable medium storing a program, the program causing a computer to execute:
   acquiring, periodically, in response to a request, or both, a color verification result of a printed article printed by an image forming apparatus from a storage storing a color measurement result of a printed article printed by the image forming apparatus;
   controlling the information processing apparatus so as to perform transmission of an execution instruction of a print job to the image forming apparatus in a case where the acquired color verification result satisfies a reference; and
   controlling the information processing apparatus so as not to perform transmission of the execution instruction of the print job to the image forming apparatus in a case where the acquired color verification result does not satisfy the reference, except, in a case where the acquired color verification result does not satisfy the reference but a setting value of the print job satisfies a predetermined condition, the information processing apparatus is controlled so as to perform transmission of the execution instruction of the print job to the image forming apparatus.

15. A management method for image forming executed by an information processing apparatus, comprising:
   acquiring, periodically, in response to a request, or both, a color verification result of a printed article printed by an image forming apparatus from a storage storing a color measurement result of a printed article printed by the image forming apparatus;
   controlling the information processing apparatus so as to perform transmission of an execution instruction of a print job to the image forming apparatus in a case where the acquired color verification result satisfies a reference; and
   controlling the information processing apparatus so as not to perform transmission of the execution instruction of the print job to the image forming apparatus in a case where the acquired color verification result does not satisfy the reference, except, in a case where the acquired color verification result does not satisfy the reference but a setting value of the print job satisfies a predetermined condition, the information processing apparatus is controlled so as to perform transmission of the execution instruction of the print job to the image forming apparatus.

16. The management method according to claim 15, wherein, in the case where the acquired color verification result does not satisfy the reference, on the basis of information of another image forming apparatus acquired from the storage, an alternative image forming apparatus with a color verification result that satisfies the reference is identified and the print job is executed by the identified alternative image forming apparatus in response to a user instruction.

17. The management method according to claim 15, wherein it is determined that the acquired color verification result satisfies the reference in a case where a difference between a color measurement value of the printed article printed by the image forming apparatus and a reference value is within a predetermined tolerance value.

18. The management method according to claim 15, wherein even in the case where the acquired color verification result does not satisfy the reference, the information processing apparatus is controlled so as to perform transmission of the execution instruction of the print job to the image forming apparatus according to a quality level required in the print job.

* * * * *